(12) United States Patent
Van Aert et al.

(10) Patent No.: US 12,505,516 B2
(45) Date of Patent: Dec. 23, 2025

(54) REDUCING IMAGE ARTEFACTS IN ELECTRON MICROSCOPY

(71) Applicant: UNIVERSITEIT ANTWERPEN, Antwerp (BE)

(72) Inventors: Sandra Van Aert, Hove (BE); Ivan Pedro Lobato Hoyos, Antwerp (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 0 days.

(21) Appl. No.: 18/720,140

(22) PCT Filed: Dec. 6, 2022

(86) PCT No.: PCT/IB2022/061821
§ 371 (c)(1),
(2) Date: Jun. 14, 2024

(87) PCT Pub. No.: WO2023/111772
PCT Pub. Date: Jun. 22, 2023

(65) Prior Publication Data
US 2025/0078216 A1    Mar. 6, 2025

(30) Foreign Application Priority Data

Dec. 17, 2021  (EP) .................................... 21215782
Mar. 1, 2022   (EP) .................................... 22159431

(51) Int. Cl.
*G06V 10/75*   (2022.01)
*G06T 5/10*    (2006.01)
*G06T 5/70*    (2024.01)

(52) U.S. Cl.
CPC .................. *G06T 5/70* (2024.01); *G06T 5/10* (2013.01); *G06V 10/751* (2022.01);
(Continued)

(58) Field of Classification Search
CPC ......... G06T 5/70; G06T 5/10; G06T 2207/10; G06V 10/751
See application file for complete search history.

(56) References Cited

FOREIGN PATENT DOCUMENTS

JP    2019-008599 A    1/2019

OTHER PUBLICATIONS

International Search Report and Written Opinion dated Mar. 21, 2023, pertaining to Int'l Patent Application No. PCT/IB2022/061821, 12 pgs.

(Continued)

*Primary Examiner* — Yassin Alata
(74) *Attorney, Agent, or Firm* — Dinsmore & Shohl LLP

(57) ABSTRACT

In a method, for training an artificial neural network (ANN) to reduce noise and/or artefacts in an electron microscopy image, a plurality of training image pairs is generated. For each pair, an undistorted synthetic specimen image and a distorted image are created by simulating additional noise and/or artefact features. The ANN is trained, in which the distorted images are used as input and the corresponding undistorted images as output. An adversarial training strategy is used in which the ANN is trained, as a generator network, in conjunction with concomitantly training a further ANN, as a discriminator network, to differentiate output produced by the generator network from synthetic images in the training set. In training, parameters of the ANN and further ANN are optimized using a generator loss function and a discriminator loss function, in which a dependency exists between said loss functions to train the networks in an adversarial manner.

18 Claims, 4 Drawing Sheets

(52) U.S. Cl.
CPC ............... *G06T 2207/10061* (2013.01); *G06T 2207/20081* (2013.01); *G06T 2207/20084* (2013.01)

(56) References Cited

OTHER PUBLICATIONS

Bersha et al. "From AC-STEM Image to 3D Structure: A Systematic Analysis of Au55 nanocluster", Science Institute of the University of Iceland, May 10, 2021, Cornell University Library, 201, Olin Library Cornell University Ithaca, NY 14853, XP81960960A, 20 pgs.

Li et al. "Fast confocal microscopy imaging based on deep learning", 2020 IEE International Conference on Computational Photography (ICCP), IEEE, Apr. 24, 2020, pp. 1-12, XP33775992A.

Li et al. "Three-dimensional atomic-scale structure of size-selected gold nanoclusters", Nature Publishing Group, vol. 451, No. 7174, Dec. 9, 2007, pp. 46-48, XP093028994.

Lin et al. "TEMImageNet Training Library and AtomSegNet Deep-Learning Models for High-Precision Atom Segmentation, Localization, Denoising, and Super-Resolution Processing of Atomic-Resolution Images", Cornell University Library, 201, Olin Library Cornell University Ithaca, NY 14853, Dec. 16, 2020 XP81883494A, 26 pgs.

Mohan et al. "Deep Denoising for Scientific Discovery: A Case Study in Electron Microscopy", Cornell University Library, 201, Olin Library Cornell University Ithaca, NY 14853, Center for Data Science, Oct. 24, 2020, XP81799527A, 24 pgs.

Isola et al., "Image-to-Image Translation with Conditional Adversarial Networks," in Proceedings 30th IEEE Conference on Computer Vision and Pattern Recognition, CVPR 2017, pp. 5967-5976.

Ignatov et al. "NTIRE 2019 Image Denoising Challenge, cf. Ignatov et al., NTIRE 2019 challenge on image enhancement: Methods and results," In IEEE Computer Society Conference on Computer Vision and Pattern Recognition Workshops, vol. Jun. 2019, pp. 2224-2232.

Kim et al., "GRDN: Grouped residual dense network for real image denoising and GAN based real-world noise modelling," in IEEE Computer Society Conference on Computer Vision and Pattern Recognition Workshops, vol. Jun. 2019, pp. 2086-2094.

REDUCING IMAGE ARTEFACTS IN ELECTRON MICROSCOPY

CROSS-REFERENCE TO RELATED APPLICATIONS

The present application is the National Phase entry of International Patent Application No. PCT/EP2022/061821 filed Dec. 6, 2022, which claims priority to European Patent Application No. 21215782.0 filed Dec. 17, 2021, and European Patent Application No. 22159431.0 filed Mar. 1, 2022, the entire contents of which are hereby incorporated by reference into this application.

TECHNICAL FIELD

The present disclosure relates to the field of electron microscopy, and, more specifically, the present disclosure relates to a method for training an artificial neural network to reduce and/or remove noise and/or other image artefacts in an electron microscopy image, e.g. in transmission electron microscopy (TEM), scanning electron microscopy (SEM) and/or scanning transmission electron microscopy (STEM) images, and/or for generating data, e.g. for use in training such artificial neural network. The present disclosure further relates to the trained artificial neural network thus obtained, e.g. in a device and computer-program product for image enhancement, on a computer-readable data carrier and in the form of a data carrier signal.

BACKGROUND

The quality of state-of-the-art electron microscopy, e.g. TEM, STEM and SEM, images is generally limited by various stochastic and deterministic image distortions, which can be directly related to the electron microscopy instrument and/or its environment. Even though the field of electron microscopy has advanced considerably in the recent past, image artefacts due to such distortions remain a limiting factor when quantitative information needs to be extracted from the sample under study. Some examples of typical image distortions in electron microscopy include X and Y jitter, fast scanning artefacts, Poisson noise, readout noise, dark current noise, X-ray noise, and image saturation.

The signal-to-noise ratio (SNR) of the recorded image can be reduced by these distortions, such that, substantively, the amount of theoretically retrievable information about the electron-specimen interactions also decreases. While lowering the electron dose degrades the quality of the recorded images, it also limits the reliability of the extraction of structural information from the images.

Even though the SNR can be increased, in a straightforward manner, by increasing the beam current and/or the acquisition time, this would increase other types of image distortions, such as shear or rotation. Increasing the electron dose is furthermore not feasible for beam-sensitive materials and, in dynamic imaging, a short exposure time for each frame can be required in order to be able to characterize the dynamics of interest.

It is also known to increase the SNR by averaging a series of image frames after performing an image registration of the sequence. For example, registering a sequence by rigid transformations and/or non-rigid transformations can be used to increase the SNR after frame averaging. However, the acquisition of a large number of individual frames also results in a high cumulative electron dose to the sample, which could again reduce the applicability in the study of sensitive materials. Furthermore, the image registration process comes at a cost of computational resources, may be sensitive to errors, and/or may lead to a further accumulation of errors due to the additional processing steps needed.

To complicate matters, EM images typically show a combination of different types of distortion in varying degrees, depending on the instrument's environment, the microscope technique and the dose. Therefore, a need exists in the art for image restoration algorithms to process images without (or with minimal) imposing constraints on the operational parameters and/or relying on too specific assumptions about the instrument and its environment, e.g. for high-quality restoration algorithms that can be easily applied to (e.g.) single-shot EM images.

Various de-noising algorithms are known in the art to improve the SNR of the images. Such de-noising algorithms often rely on spatial filtering techniques, such as by applying a median filter, a Gaussian filter, a Bragg filter and/or a Wiener filter. More sophisticated (or, at least, more complex) approaches are also known in the art, e.g. by applying a non-linear iterative Wiener filtering algorithm or periodic block matching. However, it will be understood that a more complex approach typically comes at the cost of increasing processing time and/or other computational resources, e.g. processing power and/or memory, or may even require (at least to achieve a high performance) expensive dedicated and/or non-standard hardware (e.g. application-specific integrated circuits).

A finetuned non-linear iterative algorithm could be developed to solve a specific denoising problem. However, the quality of the result would be strongly determined by the ability of the cost function (e.g. an objective function) that is being optimized to accurately and efficiently quantify the image quality. Such cost function could involve many components representative of different sources of noise and distortions if the aim is to be widely applicable, in which these components need to be separately defined and tuned by an expert, with attention for the relative scaling behavior of the components. An iterative optimization also may need to optimize many parameters, particularly for a broadly applicable algorithm, and might get easily stuck in a local, yet non-global, optimum.

Alternatively, machine learning based methods, e.g. using artificial neural networks, can be used. Particularly, convolutional neural networks can be used to achieve state-of-the-art performance to de-noise specific types of electron microscopy images. An artificial neural network can learn from data by adjusting the weight connections between artificial neurons in the network during its training process. However, such approaches, as known in the art, are often based on relatively small training datasets and/or may only offer an incomplete modelling of the different types of noise, e.g. may take the various sources of distortions in the acquisition process of experimental electron microscopy data not completely into account.

For example, EP 3736769 A1 discloses an acquisition strategy for neural network based image restoration of images with a low SNR. Image pairs corresponding to a same sample location are acquired, such that both images substantively image the same spot but have a different (stochastic) noise content. For a specific microscope and acquisition parameters setting, a plurality of such image pairs are collected to update an artificial neural network, which may have been pretrained on data that could be representative of different noise behavior, e.g. due to non-specific acquisition settings or other differences. After this update, new sample images acquired using the same acquisition parameters and equipment can be denoised by using the updated artificial neural network. The disadvantage of this approach is that the neural network is trained for specific equipment, environment and acquisition settings, and needs an update for use under new conditions. By acquiring training images, the noise characteristics in actual use of a system with specific parameters can be accurately represented in the training data input, but this unfortunately also limits the amount and versatility of the training data that can be provided.

JP 2019008599 A discloses another method for reducing noise in an image based on a forward propagation neural network. Training images are generated that include noise, and used in a supervised learning approach in combination with images that include less noise. Thus, the neural network is taught to output a less noisy image when provided with an image input. In this approach, the training data are based on an averaging method of a plurality of acquired images.

However, a need still exists in the art for an image processing technique, e.g. an algorithm that can be implemented in software, that can handle a wide range of electron microscopy modalities, e.g. SEM, TEM and STEM, and at different resolutions, e.g. both high and low resolution images. Such algorithm would, ideally, be able to process at least six types of electron microscopy images: SEM, TEM and STEM, each in a high resolution and a low resolution setting. It would also be desirable that such algorithm can compensate different types of distortions related to the technical configuration of the microscope and the specific environment in use, e.g. X and Y jitter, fast scanning noise, Poisson noise, thermal noise, down-sampling artefacts, reset noise, X-ray noise, oversaturation, etc. It is to be noted that some of these types of noise and/or artefact may have substantially different properties, e.g. the long-range spatial distortion (and directionality) of jitter is completely unlike the local stochastic effect of Poisson noise, and e.g. oversaturation effects are also completely different.

It will also be understood that such image restoration algorithm would have a relatively low computational cost, to allow fast execution and to reduce the costs associated with memory, processing power and other hardware requirements. Ideally, a near-instantaneous (substantially real-time) processing (at reasonable computational cost) would allow an evaluation of the image and calculation of quantitative measures from the image while a sample is still inside the microscopy chamber, such that adjustments to the test procedure (e.g. repeated measurements) can be carried out without substantial wastage of time, sample material and/or other resources.

SUMMARY

It is an object of embodiments of the present disclosure to provide a good, versatile and/or efficient image restoration of electron microscopy images, i.e. to reduce and/or remove image artefacts due to various sources of noise and image distortion, e.g. in an efficient and widely applicable manner, and/or to construct an artificial neural network that is adapted to provide such image restoration.

It is an aspect of embodiments of the present disclosure that the SNR of an electron microscopy image can be increased.

It is an aspect of embodiments of the present disclosure that an image restoration approach is provided that can be applied to a single image or frame in isolation, i.e. that does not rely on a sequence of images (frames; e.g. a timeseries) to be collected and/or on information that can only be obtained from other images (than the image to restore/improve itself) of the same sample. In other words, it is an aspect that imaging the same specimen repeatedly and/or other such approaches that do not allow a single image to be restored in isolation can be avoided. For example, a prior-art method might rely on multiple images of the same sample to improve the quality of a single image, e.g. by using the same microscope settings and by analyzing a sequence as function of time to identify (and/or compensate) time-dependent artefacts, and/or to collect additional data for averaging (or otherwise statistically aggregating) to reduce noise.

Obviously, since the present approach can be applied in order to improve the quality of a single isolated image, it can also be used to improve the quality of a sequence (and/or set) of images, i.e. the collection of a plurality of images from the same specimen is not precluded if so desirable, only not necessary as such.

It is an aspect of embodiments of the present disclosure that the qualitative properties of an electron microscopy image can be improved, e.g. such that an observer is better able to study an imaged specimen via a processed image obtained by embodiments of the present disclosure.

It is an aspect of embodiments of the present disclosure that the quality of quantitative measures calculated from a processed image may be restored. For example, algorithms to determine quantitative measures from an image may operate more efficiently, may be less error-prone, may produce a more accurate and/or precise output, and/or may be less complicated when receiving an input that contains less artefacts and/or has a better SNR. Likewise, structural information may be extracted from images processed in accordance with embodiments of the present disclosure in a reliable manner.

It is an aspect of embodiments of the present disclosure that image quality can be increased without necessarily requiring a higher electron beam current, longer exposure time and/or repeated (e.g. for averaging) acquisitions. Conversely, a lower dose and/or shorter acquisition time can be achieved, e.g. to image beam-sensitive samples or in a dynamic study at high temporal resolution, while achieving an acceptable image quality.

It is an aspect of embodiments of the present disclosure that a machine learning approach may be used to restore electron microscopy images (i.e. reduce image artefacts and/or noise), e.g. which can be executed particularly efficiently and does not require detailed modeling from expert domain knowledge, without the machine learning approach being overly constrained to a specific image modality, resolution, microscope system, imaging parameters and/or local environment. In other words, image restoration can be achieved without imposing extensive constraints on operational parameters, without relying on too specific assumptions about the instrument and its environment and/or requiring dedicated algorithms for different use-cases.

It is an aspect of embodiments of the present disclosure that different types of image artefacts and/or of noise can be compensated efficiently and effectively by a same algorithm (as well as for different combinations and relative strengths of the various types of artefact and noise).

It is an aspect of embodiments of the present disclosure that SEM, TEM and STEM images can be processed by the same approach in accordance with embodiments, e.g. by the same neural network architecture, at high resolution as well as low resolution (e.g. high resolution STEM/TEM/SEM images as well as low resolution STEM/TEM/SEM).

It is an aspect of embodiments of the present disclosure that X jitter, Y jitter, fast scanning noise, Poisson noise, thermal noise, down-sampling artefacts, reset noise, dark-current noise, X-ray noise, oversaturation and/or other types of noise and/or distortion can be reduced in electron microscopy images.

A method, device, computer-program product, computer-readable data carrier and/or data carrier signal in accordance with embodiments of the present disclosure achieve the above objective.

In a first aspect, the present disclosure relates to a method for (data generation and) training an artificial neural network to reduce noise and/or artefacts in an electron microscopy image. The method comprises generating a plurality of training image pairs. For each training image pair, an undistorted synthetic electron microscopy image of a simulated specimen is created and a distorted image is created from said undistorted synthetic electron microscopy image by simulating noise and/or artefact features. The method further comprises training the artificial neural network to reduce and/or remove the noise and/or artefacts in an electron microscopy image, in which the distorted images are used as training input to the artificial neural network and the corresponding undistorted synthetic electron microscopy images are used as training output of the artificial neural network. Said training uses an adversarial training strategy in which the artificial neural network is trained, as a generator network, to output an undistorted image from a distorted electron microscopy image input in conjunction with concomitantly training a further artificial neural network, as a discriminator network, to differentiate output produced by the generator network from synthetic electron microscopy images in the training set. Said training comprises optimizing parameters of the artificial neural network by optimizing a generator loss function and optimizing parameters of the further artificial neural network by optimizing a discriminator loss function, in which a dependency exists between said generator loss function and said discriminator loss function so as to train said generator network and said discriminator network in an adversarial manner.

Embodiments of the present disclosure may also relate to generating the plurality of training image pairs (as described hereinabove, and/or including the optional features discussed further hereinbelow) for the sake of obtaining simulated electron microscopy data as such, e.g. for use in different applications, experiments, and/or to train or tune a different type of algorithm, e.g. using another type of machine learning method.

In a method in accordance with embodiments of the present disclosure, the generator loss function may comprise at least one loss function component to penalize a norm value of pixel-based differences between a restored image, generated as output of the generator network in response to distorted images from said training image pairs, and the corresponding undistorted image.

In a method in accordance with embodiments of the present disclosure, the generator loss function may comprise at least one loss function component to penalize a norm value of pixel-based differences between said restored image and the corresponding undistorted image after application of a local whitening transform having a predetermined window size to both said restored and undistorted image.

In a method in accordance with embodiments of the present disclosure, the generator loss function may comprise an adversarial loss function component to reward a commensurate loss of the discriminator loss function.

According to the present disclosure, the generator loss function comprises the three loss function components referred to hereinabove and at least one of the following:

at least one loss function component to penalize a norm value of pixel-based differences between a Fourier transform of said restored image and a Fourier transform of said undistorted image, and at least one loss function component to penalize a deviation between the statistical mean, the standard deviation and/or another statistical measure of said restored image and said undistorted image.

In a method in accordance with embodiments of the present disclosure, the generator loss function may comprise at least a loss function component representative of an $L_1$-norm of pixel-based differences between said restored image and said corresponding training undistorted image and a loss function component representative of an $L_2$-norm of pixel-based differences between said restored image and said corresponding training undistorted image.

In a method in accordance with embodiments of the present disclosure, the artificial neural network may have a convolutional neural network, a dense network, a residual dense network, a grouped residual dense network, and/or a concatenated grouped residual dense network architecture. The concatenated grouped residual dense network architecture may correspond to a grouped residual dense network architecture, either with or without an attention module in a final up-convolutional output block of the network, in which the cascading chain of grouped residual dense blocks may further comprise a feature concatenation of the outputs of the grouped residual dense blocks, a feature fusion and a semi-global residual connection for globalizing hierarchical features.

In a method in accordance with embodiments of the present disclosure, the further artificial neural network may comprise a convolutional patch discriminator.

In a method in accordance with embodiments of the present disclosure, the further artificial neural network may use a relativistic discriminator.

For example, in such relativistic discriminator, the output $D_{Rap}(\bullet)$ of the discriminator may be written as $D_{Rap}(y,y_g) = \sigma(C(y) - \mathbb{E}_{y_g}\{C(y)\})$ and $D_{Rap}(y_g,y) = \sigma(C(y_g) - \mathbb{E}_y\{C(y)\})$ where $C(\bullet)$ refers to a non-transformed output of the further artificial neural network, y and $y_g$ refer respectively to an undistorted synthetic electron microscopy image of said training image pairs and an output image generated by the generator artificial neural network from the corresponding distorted image as input, $\sigma(\bullet)$ is the sigmoid function and $\mathbb{E}_g\{\bullet\}$ is an operator representing the expectation value computed on a variable v.

In a method in accordance with embodiments of the present disclosure, the further artificial neural network may use a modified convolutional patch discriminator, i.e. modified in that it does not comprise zero-padding layers and in that the batch normalization layers are replaced by instance normalization layers. Particularly, the publication of Isola et al, ⬜Image-to-Image Translation with Conditional Adversarial Networks,⬜ in Proceedings 30th IEEE Conference on Computer Vision and Pattern Recognition, CVPR 2017, pp. 5967⬜5976, describes a convolutional patch discriminator as known in the art, which may be modified by the modifications mentioned hereinabove for use in a method in accordance with embodiments of the present disclosure.

In a method in accordance with embodiments of the present disclosure, said generating of a plurality of training image pairs may comprise creating undistorted synthetic images that include scanning electron microscopy modality images (e.g. which may include SEM, and/or STEM and/or other images acquired in accordance with a scanning methodology) and imaging detector electron microscopy modality images (e.g. which may include TEM images and/or other images that are acquired by a pixelated detector, e.g. such that an entire image or multi-pixel image region is captured substantially simultaneously).

In a method in accordance with embodiments of the present disclosure, said generating of a plurality of training image pairs may comprise creating undistorted synthetic images that include images of different specimen atomic sizes, atomic distances, atomic vibrations, lattice parameters and relative intensities between atomic species.

In a method in accordance with embodiments of the present disclosure, said generating of a plurality of training image pairs may comprise creating undistorted synthetic images that include images corresponding to different microscope settings and/or properties, including at least different acceleration voltages, magnifications and detection system transfer functions.

In a method in accordance with embodiments of the present disclosure, said generating of a plurality of training image pairs may comprise creating distorted images that include combinations of simulated noise and/or artefacts representative of different noise and/or artefact sources of varying severity and relative weights.

In a method in accordance with embodiments of the present disclosure, said generating training data may comprise generating at least $10^6$ different (e.g. unique) image pairs.

In a method in accordance with embodiments of the present disclosure, said creating of the undistorted synthetic electron microscopy image may comprise generating a specimen representation and then generating the undistorted synthetic electron microscopy image of the specimen representation by simulating an electron interaction and the image formation process.

In a method in accordance with embodiments of the present disclosure, said generating the specimen representation may comprise (e.g. randomly) selecting a specimen type from a plurality of different specimen types, said different specimen types comprising at least a crystalline specimen type, an amorphous specimen type and a set of a random number of isolated points. For example, each random isolated point may be representative of an object when imaged at low-resolution, e.g. may be sufficient for modeling such specimen when only a low-resolution synthetic image thereof is desired.

In a method in accordance with embodiments of the present disclosure, said generating the specimen representation may comprise, for a selected crystalline specimen type:
  randomly selecting a random number of unique atomic types and randomly sampling the corresponding atomic numbers, Z, for each unique atomic type,
  randomly selecting a crystallographic space group, and
  randomly sampling lattice parameters and asymmetric unit cell positions within the constraints corresponding to the selected space group symmetry.

In a method in accordance with embodiments of the present disclosure, said generating the specimen representation may comprise, for a selected amorphous specimen type:
  randomly selecting a unique atomic type by sampling the corresponding atomic number, Z, and
  randomly sampling atomic positions for atoms of the selected type, until a randomly selected target density is reached.

In a method in accordance with embodiments of the present disclosure, said generating the specimen representation may comprise:
  randomly applying a space region modification with an occurrence probability less than 1 (e.g. and greater than 0), in which the space region modification comprises the removal of all content from a random volume in the specimen representation,
  randomly applying a defect modification with an occurrence probability less than 1 (e.g. and greater than 0), in which the defect modification comprises randomly changing the atomic position, radius and/or height of randomly selected atoms in the specimen representation, and/or
  adding a support layer with random characteristics to the specimen representation.

In a method in accordance with embodiments of the present disclosure, said generating the undistorted synthetic electron microscopy image may comprise simulating an image as dependent on the atoms in the specimen, e.g. on their atomic number(s) Z, and/or applying a contrast reversal.

In a method in accordance with embodiments of the present disclosure, simulating said contrast as dependent on atomic number may comprise synthesizing the undistorted synthetic electron microscopy image by a linear superposition of a projected signal for each atom in the specimen representation, in which each projected signal is modelled as a two-dimensional radial symmetric function in the projection plane corresponding to the image space, and in which said radial symmetric function comprises a weighted sum of a Gaussian, an exponential and a Butterworth function with parameters of the radial symmetric function being determined by the atomic number (Z).

In a method in accordance with embodiments of the present disclosure, said generating the undistorted synthetic electron microscopy image may comprise, after simulating said image and/or applying said contrast reversal, applying a random non-linear transformation and/or adding a random background.

In a method in accordance with embodiments of the present disclosure, the step of creating the distorted image from the synthetic image for use as training input to the artificial neural network by simulating additional noise and artefact features in the image may comprise selecting from at least a direct image formation modality and a scanning modality.

Creating the distorted image may comprise, if the direct image formation modality is selected, simulating at least a camera modulation transfer function and a photon shot noise model, and may also include a readout noise model, a fixed-pattern noise model, and/or a dark-current noise model.

Creating the distorted image may comprise, if the scanning image formation modality is selected, simulating a scanning jitter model, and, in some embodiments, also a detector noise model, a fast scan noise model, and/or a row-line noise model.

In a method in accordance with embodiments of the present disclosure, simulating the fast scan noise model may comprise applying a one-dimensional convolution along the fast scan direction between the image pixels (x) and a point spread function (PSF), wherein said PSF is composed of two component PSFs, e.g. such that $x \leftarrow x * PSF_{detector} * PSF_{readout}$, wherein said two component PSFs are expressed by:

$$PSF_{detector} = \begin{cases} \dfrac{\alpha}{4\pi^2 k^2 + \alpha^2}, & \text{if } k \leq 0 \\ 0, & \text{if } k > 0 \end{cases}, \text{ and}$$

$$PSF_{readout} = \begin{cases} e^{-ki\beta}\sin\left(\dfrac{2\pi k}{\gamma} + \theta\right), & \text{if } k \leq 0 \\ 0, & \text{if } k > 0 \end{cases},$$

in which k represents the pixel value in real space, α is a parameter of the Lorentzian function, and β, γ and θ are parameters of the damped harmonic oscillator. Said parameters α, β, γ and θ may thus be sampled from a random distribution to simulate microscopy systems with different characteristics (at least concerning the fast noise behavior). A suitable range of these parameters can be obtained by fitting several experimental images, e.g. as discussed further hereinbelow.

In a method in accordance with embodiments of the present disclosure, the step of creating the distorted image from the synthetic image for use as training input to the artificial neural network by simulating additional noise and artefact features in the image may comprise simulating a black pixel noise model, a Zinger noise model and/or a quantization noise model.

In a second aspect, the present disclosure relates to an artificial neural network for reducing noise and/or artefacts in an electron microscopy image, in which said artificial neural network is trained by a method in accordance with embodiments of the first aspect of the present disclosure.

In a third aspect, the present disclosure relates to a computer-program product for, when executed by a processor or computer, evaluating the artificial neural network in accordance with embodiments of the second aspect of the present disclosure to produce a restored electron microscopy image from an input electron microscopy image.

In a further aspect, the present disclosure relates to a data carrier comprising data corresponding to a computer-readable representation of the artificial neural network in accordance with embodiments of the third aspect of the present disclosure.

In a yet further aspect, the present disclosure relates to a data signal, e.g. a data transmission over a data communication network, comprising data corresponding to a computer-readable representation of the artificial neural network in accordance with embodiments of the third aspect of the present disclosure.

In a sixth aspect, the present disclosure relates to a method for creating a distorted image from an undistorted synthetic electron microscopy image for use as a training input for training an artificial neural network, wherein the method comprises the step of creating said distorted image from the synthetic image by simulating additional noise and artefact features in the image, whereby the method further comprises the step of selecting from at least a direct image formation modality and a scanning modality, in which creating the distorted image comprises, if the direct image formation modality is selected, simulating at least a camera modulation transfer function and a readout noise model, and may also include a photon shot noise model, a fixed-pattern noise model, and/or a dark-current noise model, in which creating the distorted image comprises, if the scanning image formation modality is selected, simulating a scanning jitter model, and may also include a detector noise model, a fast scan noise model, and/or a row-line noise model or optionally also comprises simulating a black pixel noise model, a Zinger noise model and/or a quantization noise model.

In a characteristic of the sixth aspect, the method may comprise the step of creating undistorted synthetic electron microscopy images that include:

scanning electron microscopy modality images and imaging detector electron microscopy modality images, images of different specimen atomic sizes, atomic distances, atomic vibrations, lattice parameters and relative intensities between atomic species, and images corresponding to different microscope settings and/or properties, including at least different acceleration voltages, magnifications and detection system transfer functions.

In another characteristic of the sixth aspect, simulating the fast scan noise model may comprise applying a one-dimensional convolution along the fast scan direction between the image pixels (x) and a point spread function (PSF), wherein said PSF is composed of two component PSFs, such that x←x*$PSF_{detector}$*$PSF_{readout}$, wherein said two component PSFs are expressed by:

$$PSF_{detector} = \begin{cases} \dfrac{\alpha}{4\pi^2 k^2 + \alpha^2}, & \text{if } k \leq 0 \\ 0, & \text{if } k > 0 \end{cases}, \text{ and}$$

$$PSF_{readout} = \begin{cases} e^{-ki\beta}\sin\left(\dfrac{2\pi k}{\gamma} + \theta\right), & \text{if } k \leq 0 \\ 0, & \text{if } k > 0 \end{cases},$$

in which k represents the pixel value in real space, a is a parameter of the Lorentzian function, and β, γ and θ are parameters of the damped harmonic oscillator.

In a further characteristic of the sixth aspect, the undistorted synthetic electron microscopy image may be defined as: y=$\Sigma_i f^i(|r-r_i|)$, wherein:

y is the undistorted synthetic electron microscopy image;
f(r) is the two-dimensional radial symmetric function of a projected atomic signal;
i refers to an atom in the specimen representation;
r is a two-dimensional vector.

Hereby, f(r) can be a weighted sum of a Gaussian, an Exponential and a Butterworth function:

$$f_z(r) = h_1 e^{-\frac{r^2}{2r_m^2}} + h_2 e^{-\frac{r}{r_m}} + \frac{h_3}{1 + \left(\frac{r}{r_m}\right)^{2n}},$$

where $h_1$, $h_2$, $h_3$, n and $r_m$ are positive values and the parameters of the model, and where $f_Z(r)$ is a radial function that models an atom with atomic number Z.

It should be noted that the sixth aspect of the present disclosure is not limited for use in a method according to the first aspect of the present disclosure. I.e. the generated distorted images with the method of the sixth aspect of the present disclosure can be used in other methods for training an artificial neural network or, in other words, they can be used as a training input for any method for training an artificial neural network.

The independent and dependent claims describe specific and features of the present disclosure. Features of the dependent claims can be combined with features of the independent claims and with features of other dependent claims as deemed appropriate, and not necessarily only as explicitly stated in the claims.

Figure 1:
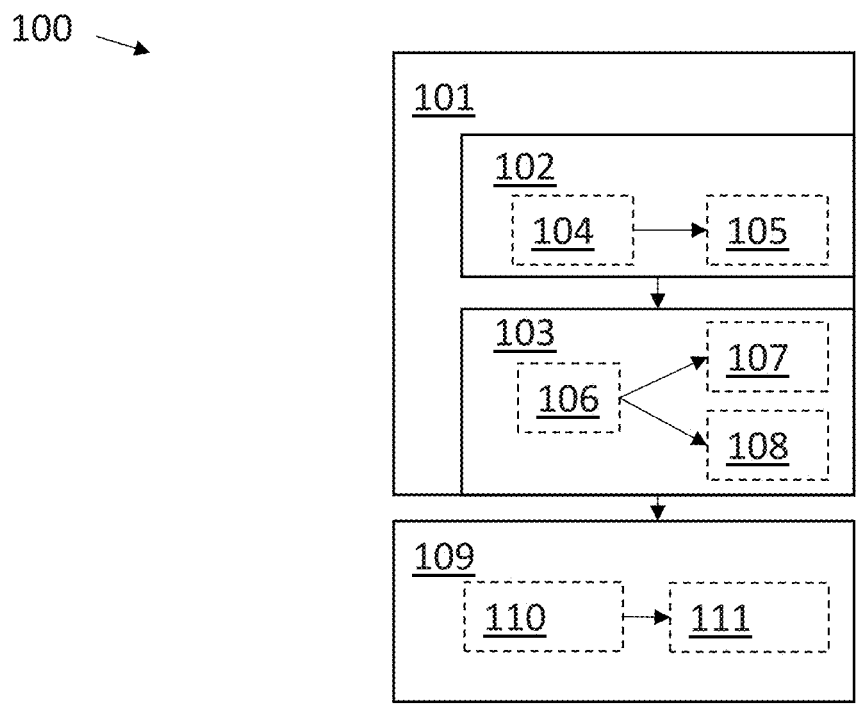
FIG. 1 shows an illustrative method in accordance with embodiments of the present disclosure.

The drawings are schematic and not limiting. Elements in the drawings are not necessarily represented on scale. The present disclosure is not necessarily limited to the specific embodiments of the present disclosure as shown in the drawings.

DETAILED DESCRIPTION OF EMBODIMENTS

Notwithstanding the exemplary embodiments described hereinbelow, is the present disclosure only limited by the attached claims. The attached claims are hereby explicitly incorporated in this detailed description, in which each claim, and each combination of claims as allowed for by the dependency structure defined by the claims, forms a separate embodiment of the present disclosure.

The word comprise, as used in the claims, is not limited to the features, elements or steps as described thereafter, and does not exclude additional features, elements or steps. This therefore specifies the presence of the mentioned features without excluding a further presence or addition of one or more features.

In this detailed description, various specific details are presented. Embodiments of the present disclosure can be carried out without these specific details. Furthermore, well-known features, elements and/or steps are not necessarily described in detail for the sake of clarity and conciseness of the present disclosure.

In a first aspect, the present disclosure relates to a method for training an artificial neural network (ANN) to reduce (e.g. remove) noise and/or artefacts in an electron microscopy image, e.g. in TEM, SEM and/or STEM images. For the sake of simplicity, image artefacts and noise, regardless of the underlying source, are simply referred to as distortions in the description hereinbelow. In other words, distortions do not necessarily refer to warping, shearing or other such illustrative undesirable structural deviations of an image from what would be the ideal image of the specimen, but may also refer to or include simple stochastic noise and/or any other deviation from the ideal image.

Referring to FIG. 1, an illustrative method 100 in accordance with embodiments of the present disclosure is shown.

Since experimentally only data can be collected that are at least to some extent distorted and/or noisy, the synthetic generation of undistorted and distorted images (e.g. in corresponding pairs) offers many aspects. It is an aspect that the ANN can be efficiently trained with a large set of realistic simulated data, that can cover a large space of different types and relative weights of noise and artefacts, different imaged specimens, and/or different acquisition settings and/or environments. For example, the ANN can be easily trained with a large set of simulated data, e.g. $3 \times 10^6$ images per trained network (without limitation thereto), that thus may cover a very wide range of possible use cases and scenarios.

The method comprises generating 101 a plurality of training image pairs. This generating comprises, for each pair, creating 102 a synthetic electron microscopy image of a specimen for use as training output to the ANN, and creating 103 a distorted image from the synthetic image for use as training input to the ANN by simulating additional (i.e. not necessarily additive, but in addition to the image content of the synthetic image) noise and artefact features. Thus, an undistorted image is simulated and a distorted image is created by applying a plurality of noise and distortion effects as can be present in real (i.e. experimentally obtained) single-shot electron microscopy images. Even though reference is made to image pairs and creating 102 an undistorted EM image and a distorted EM image for each pair, it will be understood that a same undistorted synthetic image can be reused in multiple pairs to simulate the same object under different noise and/or artefact conditions. However, since a process to generate the undistorted synthetic image may be relatively simple, as discussed further hereinbelow, it may also be feasible to generate a unique undistorted image for each pair without a prohibitive computational cost.

By training the neural network to produce an undistorted output, regardless of the strength and specific combination (e.g. relative weights) of noise and artefacts present in the input, the neural network implicitly learns to detect the distortions and to inpaint them. The inventors have found that this approach can achieve state-of-the-art restoration results for both periodic and non-periodic specimens and for different combinations of severe distortions.

Although it is possible to simulate electron-specimen interactions in high detail, e.g. even from first principles using density functional theory if so desired (cf. for example an abTEM approach as known in the art), as well as accurately model the image formation process of the electron microscope, it is generally not strictly necessary for the present purposes to achieve such extremely realistic  undistorted  synthetic images. For example, extremely realistic electron microscopy image simulations for a specimen on a support having a size of the order of a few nanometers may impose a high computational burden, and can thus easily become time-prohibitive, e.g. even when using a state-of-the-art (general purpose) graphics processing unit (GPU/GPGPU) implementation of (for example) the multi-slice method (cf. for example the CUDA-implemented MULTEM approach, as known in the art).

While such methods are not necessarily excluded in embodiments of the present disclosure, it may be useful to simulate the  undistorted  synthetic image by a simpler, and thus more efficient, method. Since the method in accordance with embodiments aims to train an artificial neural network so as to correct electron microscopy distortions regardless of the specimen under study and the specific microscope settings that are used, it may typically be sufficient that the created 102 undistorted synthetic images approximate the appearance of real electron microscopy image data adequately. On the other hand, it may be substantially more important that the process of creating 103 the distorted image generates realistic electron microscopy distortions (e.g. noise and artefacts of various possible sources, and in some embodiments, in a large number of possible combinations and relative strengths), i.e. that the electron microscopy distortion effects are modelled accurately.

The generated 101 plurality of training image pairs may thus comprise undistorted synthetic images that cover a range of scenarios so as to mimic the effect of variations in typical physical parameters of the specimen, such as atomic sizes, atomic distances, atomic vibrations, lattice parameters and relative intensities between atomic species, as well as the effect of different microscope settings, such as acceleration voltage, aberrations, magnification, detector sensitivity, detector angles, transfer function of the detection system, etc.

Creating 102 the (e.g. each)  undistorted  synthetic electron microscopy image of a specimen may comprise generating 104 a specimen representation and then generating 105 a synthetic electron microscopy image of the specimen representation, e.g. by simulating the electron-specimen interaction and/or image formation process.

Without necessarily limiting embodiments of the present disclosure thereto, in some embodiments, a specimen representation may be generated in a simulation volume (e.g. a three-dimensional matrix of voxel values, for the sake of simplicity further referred to as simulation box) that may be (e.g. slightly) larger than the size desired for the simulation, e.g. such that spatial correlation effects of distortions (which may be dependent on the type of noise or artefact) that extend (or originate) beyond the imaged portion of the specimen to simulate can be sufficiently taken into account. Thus, a specimen definition may be defined over an extended simulated box with size $\hat{l}_{xyz}^{e}$, which is an expanded version of the required simulation box size $\hat{l}_{xyz}$ (i.e.  required  in the sense of having the planar, x and y, dimensions of the image to simulate). A voxel size dr for the simulation volume may be randomly selected, e.g. from the range $[0.025, 0.90]$Å, e.g. such that the simulation box size $\hat{l}_{xyz}$ corresponds to the physical dimensions $(n_x dr, n_y dr, n_z dr)$ for the discrete matrix dimensions $(n_x, n_y, n_z)$, in which $(n_x, n_y)$ correspond to the desired image size to simulate and in which the depth dimension may be set to (e.g.) $n_z = \max(n_x, n_y)$. The extended simulation box size $\hat{l}_{xyz}^{e} = (n_x^e dr, n_y^e dr, n_z^e dr)$ may be obtained by extending the number of simulation voxels, e.g. $n_i^e = n_i + \text{round}(d_{ext}/dr)$ for each dimension $i = x, y, z$, in which $d_{ext}$ corresponds to a predetermined maximum correlation distance of scanning distortions (e.g., generally, a predetermined maximum value over which distortions are presumed to have a significant effect on the image).

As a first step, a specimen type may be selected from a plurality of different specimen types, e.g. a random selection. For example, the specimen type may be randomly sampled from the following options: a crystalline specimen, an amorphous specimen and individual points. It is however also possible to train an ANN to be specific to one specimen type, such that it may not be necessary to sample from different types, or the specimen types may be extended to cover more (e.g. more specific) and/or other options, e.g. to further increase the flexibility of the ANN to enhance different types of image.

To generate a specimen representation for the crystalline class of specimens, a random number of unique atomic types may be selected, e.g. within a range of [1,16] from atomic types (Z atomic number) in the range of [1,103], without limitation of embodiments to this pragmatic approach. The crystallographic space group may be randomly chosen, e.g. from a range between [1,230]. The lattice parameters, e.g. â and the angle θ̂, of the selected space group may also be chosen randomly, e.g. within a range [3.1,25.0]Å for â and [45,120]° for ˆ. Asymmetric unit cell positions may be randomly generated, i.e. within the constraint volume of its space group symmetry. After the application of the space group symmetry to the atomic positions on the asymmetric unit cell, the minimum atomic distance of the atoms in the unit cell should typically be within the range [0.95, 7.0]Å (without limitation). An easy approach to enforce this physical constraint is to reject the generated specimen representation when the minimum atomic distance is determined to be unrealistic, e.g. fails to fall within the aforementioned range. In other words, the specimen generation step may be repeated, if needed until it satisfies this criterion.

To generate an amorphous specimen, a unique atomic type may be randomly selected, e.g. from a (Z atomic number) range [1, 103]. The atomic positions of amorphous specimens may be generated by randomly placing atoms within the extended simulation box, e.g. subject to the constraint of a randomly chosen minimum atomic distance within the range [0.95,1.6]Å. This process may be terminated when a randomly selected target density, e.g. chosen from the range [2.0, 7.0]g/cm$^3$, is obtained.

To generate a specimen representation for the  individual points  class, a number of points may be randomly chosen from a predetermined positive integer range. Then, the three-dimensional positions (3D coordinates) of the particles may be randomly generated within the extended simulation box size, e.g. again subject to a minimum distance constraint, which may be randomly chosen from (e.g.) the range of [1,20] dr. This approach may also be used for the generation of low-resolution images (e.g. for which a more detailed specimen generation approach as described hereinabove may be unnecessary). Particularly, this simple approach may enable a fast and efficient generation of sufficiently realistic low-resolution images, e.g. such that low-resolution training data for the neural network can be created at a very low computational cost.

Generating the specimen representation may also comprise, after the step of selecting a class of specimen and generating base content for the selected class, randomly choosing a specimen orientation. For example, the orientation may be chosen from zone axis orientation and a random orientation, e.g. with an occurrence probability for zone axis orientation of 0.75. For crystalline specimens, the zone axis orientation may be randomly chosen between its first eight main zone axes. In addition, an angle mistilt may be randomly sampled along the chosen zone axis orientation, e.g. by using a normally distributed random number with standard deviation of 5°. For non-crystalline specimens a random 3D orientation may be generated. In order to avoid alignment of crystalline specimens along the xy directions, an extra random rotation along the z axis may be performed. While the optional application of a randomly sampled 3D orientation to the specimen representation might seem less obvious if the specimen is already substantially aperiodic and/or anisotropic, e.g. is generated as a set of random points and/or as an amorphous specimen (e.g. as discussed hereinabove), it is to be noted that the specimen representation, regardless of its specimen type, may typically be generated in a predetermined simulation volume (e.g. rectangular box), and may thus be constrained by predetermined dimensions, e.g. which may include a predetermined and/or constant thickness (box height). Therefore, a random reorientation in 3D space may be used to create thickness variations and/or thickness gradients across the set of specimens used to generate the training set, Nonetheless, it is noted that embodiments are not necessarily limited to using this optional random 3D orientation step, nor to using (only) a predetermined simulation box size.

After generating the specimen representation, as discussed hereinabove, the specimen may be oriented (cf. the selected orientation) and cropped in the xy plane in order to fit within the extended simulated box. This may be followed by a random generation of a wedge of the specimen, with an occurrence probability of 0.75. The wedge can be generated at the top and/or bottom of both surfaces of the specimen, e.g. each with an equal occurrence probability of 0.33. The wedge orientation may be randomly generated in the xy plane, e.g. with an angle randomly chosen between $[5,45]°$.

Shapes can furthermore be applied to the specimen, e.g. with an occurrence probability of 0.5 (of applying a shape modification, as opposed to leaving the specimen unmodified by a further shape). To avoid preference of any specific kind of shape (e.g. from three different types of shape), the probability of occurrence of each shape class may be set to 0.33 (or, generally, 1/n for n different kinds of shape that are implemented). A first type of shape may be a polygon rod shape, e.g. in which its number of cross-section vertices sliced along its length may be randomly chosen between $[3,15]$. The rod may furthermore be randomly placed and oriented. Likewise, the radius of the polygon may be randomly chosen, e.g. from $[0.01, 0.5]\hat{l}_{xyz}$. Another shape class may be a convex polyhedral shape, e.g. in which its radius and number of vertices are chosen in the range of $[0.01, 0.5]\hat{l}_{xyz}$ and $[4,20]$, respectively. A further shape class may be a hard shape in which all atoms on one side of a randomly generated 3D plane parallel to the z orientation are removed. Additionally, the application of a chosen shape can be used to remove or keep the atoms of the specimen, i.e. clearing the content of the shape or voiding its complement, which may for example be controlled by a random number to set the probability of keeping the atoms at 0.5.

Defects may be applied to the specimen representation, e.g. with an occurrence probability of 0.8 (e.g. applying a predetermined probability to apply a defect modification). This process may start by a random selection of atoms within the specimen, in which the number of selected atoms $n_{sel}$ may be e.g. randomly chosen from the range $[0,n_{max}]$, where $n_{max}$=round($0.25n_{atoms}$) and $n_{atoms}$ is the number of atoms present in the specimen. The atomic positions, radius and heights of the selected atoms may be randomly changed with an occurrence probability of 0.5. The atomic position may be displaced by adding a normally distributed random number with standard deviation equal to its atomic radius. The radius and height may be rescaled by a random factor chosen within the range of $[0.75,2.0]$ and $[0.01,2.0]$, respectively.

The specimen generation may also comprise a (e.g. final) step of adding a support layer, e.g. with an occurrence probability of 0.95. Crystalline and amorphous support layers may be added to the specimen, each one with a probability of occurrence of 0.5. The thickness of the support layer may be randomly chosen, e.g. within a range of $[1,30]$ nm. The process already described hereinabove for crystalline and amorphous specimen generation may also be used for the generation of the support layer (e.g. excluding the optional step of shape generation for generating the support structure). The atoms generated for the (crystalline and/or amorphous) support layer may be added to the specimen, e.g. at the appropriate position in the height dimension z.

In the step of, for a training image pair at hand, creating 102 a synthetic electron microscopy image of a specimen for use as training output to the ANN, generating 104 the specimen representation (e.g. in the expanded voxel simulation box discussed hereinabove) may be followed by generating 105 the synthetic "undistorted" EM image of the specimen from this specimen representation. Since the procedure outlined hereinabove for generating the specimen representation can be relatively simple, it is feasible to generate a new specimen for each undistorted image to be created without a high processing cost. However, embodiments may alternatively reuse a generated specimen representation for a plurality of undistorted images, if so desired.

To generate undistorted images that approximate the appearance of real electron microscopy data, subject to some physical requirements, the undistorted data generation may comprise simulating a mass-Z contrast relationship, and an optional step of simulating a contrast reversal dependence related to the projected specimen structure.

Electron microscopy images that are substantially characterized by a mass-Z contrast dependence correspond to techniques such as dark-field TEM (DF-TEM), high-resolution TEM (HRTEM), annular dark-field STEM (ADF-STEM), high-angle annular dark-field STEM (HAADF-STEM), secondary electrons SEM (SE-SEM) and backscattered electrons SEM (BSE-SEM) under specific sample and microscope settings.

High or medium resolution electron microscopy data can be synthesized as a linear superposition of the projected signal of each atom of the specimen at a given orientation. Furthermore, each projected atomic signal can be modelled as a 2D radial symmetric function $f(r)$. Under this assumption, the "undistorted" synthetic image y can be written as $y=\Sigma_i f^i(|r-r_i|)$, where the index i refers to an atom in the specimen representation and r is a two-dimensional vector. Moreover, each atom with atomic number Z can be modelled by a radial function $f_Z(r)$ as a weighted sum of a Gaussian, an Exponential and a Butterworth function:

$$f_z(r) = h_1 e^{\frac{r^2}{2r_m^2}} + h_2 e^{\frac{r}{r_m}} + \frac{h_3}{1 + \left(\frac{r}{r_m}\right)^{2n}},$$

where $h_1$, $h_2$, $h_3$, n and $r_m$ are the parameters of the model (which are restricted to positive values). This illustrative parameterization has the aspect that it can accurately model substantially any simulated/experimental incoherent electron microscopy image, it can be used to easily include physical constraints, and only five parameters are required.

The numerical parameter ranges that are applied for the data generation may be fine-tuned based on analyzing a large number of high quality (e.g. ab initio or at least detailed interaction) simulations of (S)TEM images for different specimens and microscope settings. This has the aspect that, once suitable parameter ranges (or sampling distributions) are determined for each atomic number Z from detailed simulations of electron microscopy image formation and electron-specimen interaction processes, sufficiently realistic images (for the present purposes) can be generated at a very low computational cost by random sampling of the parameters.

The radial function $f_Z(r)$ may thus be used to encode physical information into the model, e.g. by determining $r_m$ as proportional to the transformed two-dimensional mean square radius, $\hat{r}_Z$, of the projected atomic potential, $V_Z^p(r)$, e.g. as: $r_m = a \times (\hat{r}_Z)^\alpha + b$, with:

$$a = \frac{Std_z\{\hat{r}_z\}}{Std_z\{(\hat{r}_z)^\alpha\}}$$

$$b = \mathbb{E}_z\{\hat{r}_z\} - a \times \mathbb{E}_z\{(\hat{r}_z)^\alpha\}$$

$$\hat{r}_z = \left[\frac{\int_0^\infty r^2 V_z^p(r) r\, dr}{\int_0^\infty r^2 V_z^p(r,z) r\, dr}\right]^{\frac{1}{2}}$$

in which α is a uniform random variable, e.g. in the range of [0.75,1.25].

The parameter n may furthermore be constrained to be a uniform random variable in (e.g.) the range [4.0,16.0], to ensure realistic tail behavior of the model function $f_Z(r)$. The other parameters of the radial function model, the linear coefficients $h_1$, $h_2$ and $h_3$, can be randomly chosen within the range [0.5,1.0], subject to the constraint $\int\int f_{Z_i}(r)\, dr > \int\int f_{Z_j}(r)\, dr$ if $Z_i > Z_j$, where $Z_i$ and $Z_j$ are the atomic numbers of two elements of the specimen (which condition can be applied, usefully, for a wide range of different dose regimes, e.g. for low as well as high doses, imaging modalities and resolutions, e.g. for low as well as high resolution simulated images). This constraint arises from the fact that the integrated intensity of quasi-incoherently scattered electrons of a given atomic number is proportional to $Z^\gamma$, in which γ is a real number between 1.0 and 2.0 depending on the microscope settings.

The undistorted data generation may use (e.g. as per the random selected modality), in addition to the mass-Z contrast simulation discussed hereinabove, a simulated contrast reversal dependence. Where the aforementioned approach may be directly usable for simulating dark-field TEM (DF-TEM) and/or the other modalities under specific settings and/or for specific types of samples, electron microscopy may also show contrast inversion, e.g. typically for experimental techniques such as bright-field TEM (BF-TEM), HRTEM, BF-STEM and SE-SEM techniques for specific samples and/or under specific microscope settings. In case of BF-TEM and BF-STEM, regions of the specimen which transmit electrons appear bright while those that scatter appear dark. However, in HRTEM and SE-SEM, this effect could also arise due to the microscope settings and/or due to the sample composition and orientation.

The probability of occurrence of the contrast inversion mechanism related to the projected specimen structure (e.g. of applying the optional inversion step) may for example be set to 0.5. The contrast inversion can be approximately written as y←max(y)−y. This approach (and sampling probability ] without limitation thereto) can usefully be used for a wide range of scenarios, e.g. for different dose regimes, resolutions and/or simulated imaging modalities.

To introduce a non-linear dependence between the generated image intensity and the projected structure of the specimen, y may be non-linearly transformed (e.g. with an occurrence probability of 0.5) by y←|y|$^\beta$, where β may be chosen as a uniform random number between [0.5,1.5]. To further break this linearity, a random background may be added to y. A background may be randomly chosen between a 3D plane and a Gaussian background model, with an occurrence probability of 0.5 for each one. In the first case, a randomly oriented positive 3D plane may be generated with a random height between [0,max(y)/2]. In the second case, a Gaussian center and its standard deviation may be randomly chosen within the range of the x,y simulation box size and $[0.2, 0.6] \cdot \min(n_x, n_y)$, respectively.

The inventors have found, from analysis of experimental and simulated data, that the ratio $r_{std/mean} = Std\{y\}/E\{y\}$ of typical electron microscopy images (of various modality) falls in the range of [0.01,0.35]. Therefore, if the undistorted electron microscopy image under construction does not fulfill the latter constraint, it may be linearly transformed by y←cy+d, with c and d chosen such as to bring the ratio $r_{std/mean}$ within the range of the constraint.

The step of generating undistorted images that approximate the appearance of real electron microscopy data from the specimen representation may conclude with a normalization, e.g. by dividing the constructed undistorted synthetic image by its maximum pixel value: y←y/max(y).

It is to be noted that the parameterization of the model and the randomness of its parameter sampling, as outlined hereinabove, allow to simulate a wide range of imaging configurations and interactions, such that information can be encoded in the generated high or medium resolution electron microscopy image to mimic the influence of the atomic size, atomic vibration, relative intensities between atomic species, detector angle, acceleration voltage, aberrations and/or detector sensitivity.

Thus, by this approach, it is feasible to create 102 a large number of undistorted synthetic images that are sufficiently realistic, e.g. approximate the appearance of real electron microscopy images adequately, at a reasonable computational cost (e.g. not time and/or resource prohibitive). As already noted, it may be important that the process of creating 103 the distorted image generates (may be very) realistic electron microscopy distortions, and may also covers a wide range of different types of potential distortions. Since the method aims to create a ANN for restoring electron microscopy images independently from the sample under study (and may be independently from the equipment used, the image modality, microscope settings, the environmental conditions, ] ), the generation of electron microscopy distortions should be modelled accurately and with attention to detail. In line with the approach for generating 102 the undistorted synthetic images discussed hereinabove, the distorted image creation 103 may be modelled as a realization of stochastic variables. This allows a wide range of possible scenarios and conditions to be covered by the training set under construction, while also enabling the generation of a large training set at a reasonable computational cost.

The distorted data may be built by sequentially applying distortions, e.g. adding (not necessarily only additively though) distortion types in a specific sequence. The sequence may correspond to the order of occurrence of physical distortion processes during data acquisition for a selected electron microscopy technique. A distinction can be made between a process flow for simulating distorted TEM images and for S(T)EM images. Thus, pairs of undistorted/distorted TEM, STEM and SEM at both low and high resolution can be generated by applying either one of the sequences of distortion models. One distortion simulation flow that can be applied substantively corresponds to modalities in which an image is acquired by a pixelated detector system, for the sake of simplicity referred to as TEM or TEM-like modalities, and another distortion simulation flow that can be applied corresponds to modalities in which an image is acquired pixel by pixel using a scanning detector system, for the sake of simplicity referred to as S(T)EM, SEM-like or S(T)EM-like modalities.

For example, in an illustrative approach, the training set may be constructed by combining a plurality of (sub) datasets, e.g. six datasets (without limitation to this illustrative number), in which each dataset may be specifically generated for a corresponding predetermined imaging modality and/or target image type, e.g. for respectively SEM, STEM and TEM, and for resp. low resolution and high resolution, thus forming a total of (e.g.) 3×2 datasets. Each dataset may be associated with a set of high-level parameters that are set differently (e.g. a set of selected generator options and/or parameters). For example, a high-level parameter may correspond to a sampling range or sampling distribution parameter for a random sampling process used in one of the steps discussed hereinabove and/or hereinbelow. A high-level parameter may control the execution for a specific process step and/or the order of process steps to differentiate the training data generation between different target modalities. As an example, the inventors have generated 3 million image pairs for each of the six subdatasets referred to hereinabove, and were able to obtain good results when training a neural network to restore images using this data, as discussed further hereinbelow.

While an example is given below for generating either TEM and S(T)EM distortions, it will be understood that this approach can be extended to cover other modalities and/or to differentiate the process flow of different subclasses within the TEM or SEM/STEM class. However, it was found that distinguishing between an image-detector-based imaging class and a scanning-based imaging class can suffice to offer a good degree of realism and versatility of training data. By tuning a parameter selection of these broad classes, a more specifically differentiated processing can be obtained, e.g. to generate either SEM-like data or STEM-like data from substantively the same process flow. Also, by further tuning parameter ranges and options, the behavior of the process flow can be tuned to be more representative for high-resolution imaging or for low-resolution imaging.

For simulating TEM-like distortions, a TEM camera modulation-transfer function, photon shot noise model, fixed-pattern noise model, dark-current noise model, readout noise model, black pixel noise model, Zinger noise model and/or quantization noise model may be applied to the undistorted synthetic image to obtain the distorted image, and in some embodiments, in the order as mentioned here. In some embodiments, all of the mentioned distortions are simulated and applied, may be in said sequential order. The readout noise model may comprise thermal noise, flicker noise and/or reset noise models, e.g. which may be applied in that order, e.g. all three types of readout noise may be applied in said order.

For simulating S(T)EM-like distortions, a scanning jitter model (respectively, e.g. consecutively, in X and Y directions, i.e. the fast and slow scanning directions or row and column direction), a detector noise model, a fast scan noise model, a row-line noise model, a Zinger noise model and/or a quantization noise model may be applied to the undistorted synthetic image to obtain the distorted image, and may be in the order as mentioned here. In some embodiments, all of the mentioned distortions are simulated and applied, and in some embodiments, in said sequential order. Optionally, the simulation flow may also include a step of applying a black pixel noise model, e.g. after applying the row-line noise model and (at least) before applying the quantization noise model. However, this optional step may not be performed, for the reasons discussed hereinbelow.

Thus, the step of creating 103 a distorted image from the synthetic image for use as training input to the ANN by simulating additional noise and artefact features in the image may comprise (e.g. randomly) selecting 106 from at least a direct image formation modality and a scanning modality. Creating 103 the distorted image may comprise, for the direct image formation modality 107, simulating at least a camera modulation transfer function and a readout noise model, and may also include a photon shot noise model, a fixed-pattern noise model, and/or a dark-current noise model. For the scanning image formation modality 108, creating 103 the distorted image may comprise at least simulating a scanning jitter model (e.g. in both scanning directions), and may also include a detector noise model, a fast scan noise model, and/or a row-line noise model. Creating 103 the distorted image may also comprise, in either or both modality options (with not necessarily the same selection or combination of the following for each modality), simulating a black pixel noise model, a Zinger noise model and/or a quantization noise model.

Figure 2:
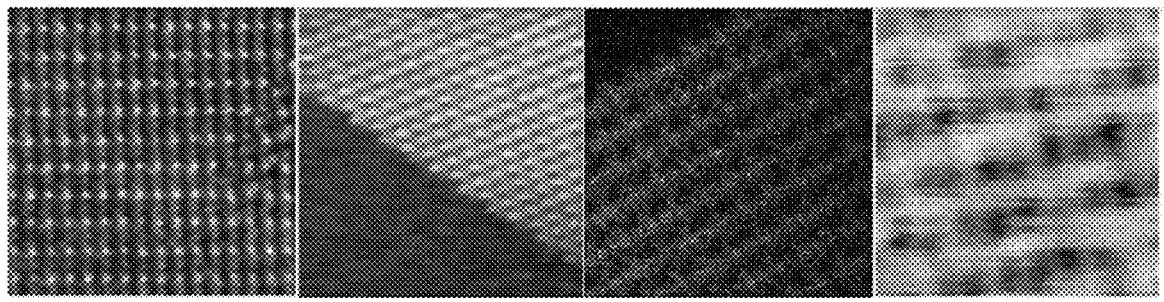
FIG. 2 illustrates various different types of distortions (e.g. noise and/or image artefacts) that can be observed in electron microscopy images, in order to illustrate aspects of embodiments of the present disclosure.
Figure 2:
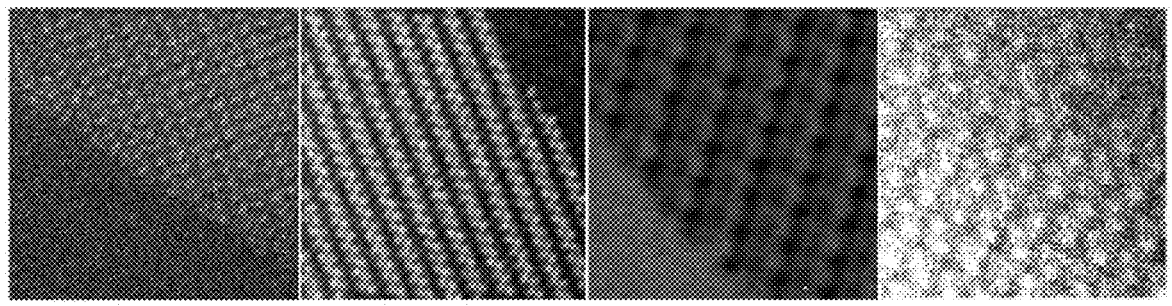

FIG. 2 shows examples of typical distortions (e.g. noise and/or artefacts) that may be present in electron microscopy images. The top row shows, from left to right, examples of: X (fast scan direction) jitter, fast scanning artefacts, Poisson noise and Y (slow scan direction) jitter. The bottom row shows, from left to right, examples of: thermal noise, downsampling artefacts, X-ray noise, and cut-off artefacts, e.g. to simulate upper-clipping artefacts (upper boundary cut-off) and/or lower-clipping artefacts (lower boundary cut-off).

Transmission electron microscopy (TEM) images are recorded using parallel illumination. Generally, the electron signal acquisition is typically configured such that the detector output is directly proportional to the time-averaged flux of electrons reaching the detector. The electrons may be detected indirectly, e.g. by a charge coupled device (CCD) sensor or a complementary metal oxide semiconductor (CMOS) sensor, or by a direct electron detector. For indirect detection, primary electrons are converted to photons in a scintillator, which are directed to the CCD/CMOS sensor via a lens or fiber optic coupling. In direct electron detectors, a suitable CMOS sensor is directly exposed to the electron beam.

Scattering of the incident electrons over the detector can spread the detection of electrons over multiple pixels, which can be described quantitatively using a modulation-transfer function (MTF). The MTF may thus represent an isotropic smearing out of features on the recorded TEM image, which typically cannot be distinguished from an undistorted TEM image that is recorded with other microscope settings. This effect may thus be applied to transform the undistorted TEM image by a convolution with a corresponding point-spread function (PSF), which is the Fourier transform of the MTF: $y \leftarrow y*PSF$.

After an initial conversion of the incident electron to its photon counterpart, the generated photons will hit a photosensor pixel area, which releases photoelectrons proportional to the light intensity. Due to the quantum nature of light, an intrinsic uncertainty arises form random fluctuations when photons are collected by the photosensor. To simulate photon shot noise, this uncertainty can be described by a Poisson process P with mean $ax$: $x \leftarrow P(ax)/\alpha$, where $\alpha$ is a dose scale factor. The denominator a restores (at least approximatively) x to its original range.

Fixed-pattern noise (FPN) is a pixel gain mismatch phenomenon that is caused by spatial variation in the thickness of the scintillator, fibre-optic coupling, substrate material, CCD bias pattern and/or other detector-related artefacts. This produces variations in the pixel-to-pixel sensitivity and/or distortions in the optical path to the CCD or in the CCD chip itself. Since FPN is a property of the detector arrangement as such, it cannot be fully eliminated. However, this can be suppressed by using a flat-field correction procedure, as is commonly applied. The residual distortion may be modelled as a normal distribution $\mathbb{N}$ with zero mean and standard deviation $\sigma$: $x = x + x \cdot \mathbb{N}(0, \sigma)$.

Furthermore, dark currents can be caused by imperfections or impurities in the depleted bulk semiconductor material (Si) and/or at semiconductor-oxide (Si—SiO$_2$) interfaces of the detector. Such defect sites introduce electronic states in the forbidden semiconductor gap which allows valence electrons to jump to the conduction band and thus to be collected in the sensor wells. This noise is independent of the photon/electron-induced signal, but highly dependent on device temperature due to its thermal activation process. This effect may cause dark current non-uniformity distortions and dark-current shot noise.

Different pixels in a hardware photosensor cannot be manufactured exactly identically, and variations in the photo detector area that are spatially uncorrelated, surface defects at the SiO$_2$/Si interface and discrete randomly distributed charge generation centers cannot be avoided in practice. Therefore, different pixels will typically produce different amounts of dark current, causing a dark-current nonuniformity (DCNU) across the image. This is manifested as a fixed-pattern exposure-dependent noise, which may be modelled by a superposition of two distributions: a log-normal distribution (lnN) may be used to represent the main effect and a uniform distribution (U) for ⟦hot-pixels⟧ or ⟦outliers⟧: DCNU=ln$\mathbb{N}(\mu,\sigma)$+U(a, b), with $\mu$ and $\sigma$ the mean and standard deviation parameters of the lnN, and e.g. $a=\mu+5\sigma$ and $b=\mu+8\sigma$.

Since dark signal noise originates from the random arrival of the generated electrons, which is governed by a Poisson process, dark-current shot noise in the image may be modelled by additively applying shot noise (represented by the Poisson distribution) to an array of simulated DCNU values: $x \leftarrow x+P(DCNU)$.

Readout noise is a form of temporal noise that is generally defined as the combination of the circuitry noise sources (that are not otherwise explicitly accounted for) between the photoreceptor and the analog-to-digital converter (ADC) circuitry. This may include thermal noise, flicker noise and reset noise.

Thermal noise arises from equilibrium fluctuations of an electric current running through an electrical conductor due to the random thermal motion of the charge carriers. It is independent of illumination and occurs regardless of any applied voltage. This noise is commonly referred to as Johnson noise, Johnson-Nyquist noise or simply (in view of its spectrum) as white noise. It can be modelled by a normal distribution with zero mean and an appropriate standard deviation $\sigma$: $x \leftarrow x+\mathbb{N}(0, \sigma)$.

Flicker noise is also referred to, due to its spectral properties, as 1/g noise or pink noise. This type of noise is generally caused by imperfect contacts between two junction materials, e.g. in metal-to-metal, metal-to-semiconductor and semiconductor-to-semiconductor junction interfaces. Since metal-oxide semiconductor field-effect transistors (MOSFETs) are used inside each pixel of a CMOS detector, CMOS image sensors are typically more sensitive to 1/g noise than CCD sensors. The level of Flicker noise in a CCD sensor is dependent on the pixel sampling rate. This type of noise can be modelled by: $x \leftarrow x + \mathcal{F}^{-1}\{\mathcal{F}(\mathbb{N}(0,\sigma))/g\}$, in which $\mathcal{F}$ represents the two-dimensional Fourier transform, $\mathcal{F}^{-1}$ the inverse two-dimensional Fourier transform, $\sigma$ is an appropriate standard deviation and g the reciprocal distance.

Prior to the measurement of each pixel⟦s charge packet (stored charge representative of the indirectly/directly received electron dose), a sense node capacitor assigned to the pixel⟦s row typically needs to be reset to a reference voltage level, which exposes all pixels in that row to noise entering through the reset line, a transfer gate, and/or a read transistor. This can be observed in images as horizontal lines having fixed and temporal components. The reset noise (RN) follows a normal distribution with zero mean and appropriate standard deviation, and can therefore be modelled by sampling a random value per row and applying it to all the pixels in that row: $x \leftarrow RN(0,\sigma,x)$, wherein RN represents an operator that acts on x to generate such Gaussian sampled reset noise on a row-per-row basis.

Black pixel noise refers to dots and/or regions of the sensor in which pixels or small clusters of pixels have a significantly lower response than their neighbours, thus resulting in darker or black spots in the image. Some black pixels can be created in the production process of the sensor array, e.g. the CCD camera, while others can appear later during the lifetime of the detector. Black pixels are time-invariant and the same black pixel will always appear at the same coordinates in the image. Black pixel dots (i.e. isolated black pixels) may be modelled by generating a sensitivity mask ($S_{black\ noise}$) with a spatially uniform distribution for a randomly sampled number of black points, and black pixel noise regions may be generated in the mask by applying a random walk process for a given number of steps to the black point positions. The sensitivity mask can then be applied (i.e. as element-wise multiplicative map) to the distorted image under construction: $x \leftarrow x \cdot S_{Black\ noise}$.

Zinger noise (or simply Zingers) refers to spurious white dots and/or regions that appear randomly in CCD images. Electron generated X-rays, cosmic rays and muons can produce a burst of photons in the scintillator material, thus creating white spot or streak artefacts in the image. Radioactive elements (e.g. particularly Thorium) that may be present in fibre optic tapers of the system can also lead to zingers. This type of noise/artefact can also be modelled by generating a sensitivity mask ($S_{Zinger\ noise}$), with a spatially uniform distribution of a randomly sampled_number of Zinger points. Similar to the black pixel noise, regions can be generated by applying a random walk process for a given number of steps to the Zinger point positions. The mask can be, similarly to the black pixel artefacts discussed hereinabove, applied multiplicatively: $x \leftarrow x\ S_{Zinger\ noise}$.

It is to be noted that the illustrative disclosed modelling processes for Zinger noise and black pixel noise can be considered to be substantially similar or even the same. However, in practice, it will be understood by the skilled person that a difference exists in the sense that, in simulating black pixel noise, low intensity values are generated, while high intensity values are generated for Zinger noise. Furthermore, in real-life data, black pixel noise may have a fixed pattern, while Zinger noise may typically appear in more random positions. Thus, a specific implementation of both types of simulated distortion may be a matter of mere routine, e.g. straightforward parameter tuning and/or obvious parameter selection. These Zinger and black pixel noise artefacts may be considered to be analogous to salt-and-pepper noise (which is e.g. well-known and extensively studied in the fields of conventional photography and image processing), in which the modelling process is quite similar, even though the underlying origin of the individual ⌊salt⌋ and ⌊pepper⌋ artefacts is not.

Finally, in order to obtain an image in digital form, the analog voltage signal read-out is quantized in a last stage of the acquisition chain into discrete values using an analog to digital converter (ADC). This process introduces quantization noise, which can be modelled by: $x = \text{round}(\alpha x)$, in which a represents the ADC gain.

Unlike the TEM (and similar modalities) image formation process discussed hereinabove, scanning (transmission) electron microscopy (SEM/STEM) images are acquired one pixel at a time, by scanning a (convergent) electron beam along scanning lines across the sample, e.g. with a constant stationary probing (determined by the so-called dwell time). The dimension of each square-shaped pixel in physical space is determined by the magnification. The scanning direction is referred to as the fast/row scan direction. The scanning pattern may start, for example, at the top-left corner of the image (and thus at a corner of the specimen area being scanned). After scanning one row of n pixels, the electron probe may return to the next row⌊s starting pixel. This time to jump back to the first pixel of the next row is referred to as the fly-back time. Numerous technical improvements in high-performance S(T)EM design notwithstanding, the presence of distortions on the recorded images remains a challenge that hampers the extraction of quantitative information from the sample under study. Similar to the approach for TEM distortion simulation, a sequence of transformations may be applied to the undistorted image (not intended in the narrow sense, i.e., generally, operations applied to the image) to obtain a simulated distorted image that corresponds to the undistorted synthetic image.

Scanning jitter (SJ) is caused by beam instabilities while scanning a raster pattern across the sample during the image acquisition process. Two jitter effects can be distinguished: X-jitter causes a random shift of pixels along the fast scan direction, while Y-jitter appears as a stretching and/or squishing of scan lines and/or as line interchanges along the slow scan direction. Due to the serial nature of the acquisition process, such displacements do not occur entirely at random (e.g. at least not uniformly distributed, independently and/or uncorrelated), but are dependent of its previous scan position.

Jitter noise displacements may be simulated by using the Yule-Walker correlation scheme on time series. Furthermore, the fast and slow scanning directions may be (at least approximatively) modelled independently, in view of the large difference in the involved time scales. Thus, jitter noise may be approximatively modelled by displacement series in discrete pixels, in which each term of the series depends on the previous one, such that a tendency of departure can persist. Mathematically such displacement series can be described as:

$$\Delta_t^k = \frac{a_t^k}{\sqrt{1 - \phi_t^2}}, \text{ if } k = 1$$

$$\Delta_t^k = \phi \Delta_t^{k-1} + a_t^k, \text{ if } k > 1$$

where $t = \{x, y\}$ (i.e. X and Y jitter can be treated independently, e.g. sequentially) and k is the pixel index along a given t direction. $\phi_t$ is a correlation coefficient (in the range of [0,1]), which describes the coupling between two consecutive values of the series. $a_t^k$ is a normally distributed random number with zero mean and standard deviation $\sigma_t$. The (intermediate) distorted image may then be created by using bicubic interpolation and evaluating on the non-regular grid, which is built by adding the positions of the regular grid and the generated displacements. Thus, the distorted image under construction may be updated by the (for X- and Y-) jitter processes: $x \leftarrow SJ(y)$.

Similar to the detector arrangement discussed hereinabove for TEM, in the S(T)EM modality, electrons also need to be detected by a sensor, typically a scintillator coupled to a photomultiplier tube (PMT), e.g. via a mirror or other type of reflector structure, e.g. a reflective tube. Electrons incident on the scintillator cause photons to be emitted, which are directed to the PMT via the reflector, e.g. through a light pipe. The PMT comprises a photocathode that emits photoelectrons when illuminated by the photons, a series of multiplying stages that progressively amplify the signal, and finally an anode that collects the resulting amplified current, which then can be measured by conventional ADC electronics. The statistical process of the electron multiplication can be modelled as a series of Poisson events, using the full-width at half-maximum (FWHM) of a pulse at the anode per single incident electron:

$$FWHM = s\sqrt{2 \ln 2}\, m_c \eta G \sqrt{\frac{1 - \eta + \frac{1}{\delta - 1}}{m_c \eta} + \frac{\sigma_c^2}{m_c^2}}.$$

This equation for the FWHM relies on the assumption that the secondary gain $\delta$ at each stage inside the PMT is equal. G refers to the PMT gain, $\eta$ to the detective quantum efficiency (DCE), $m_c$ to the average number of photons collected per incident electron, and $\sigma_c^2$ to the variance in this number of photons.

A good approximation for the noise spectrum of a photomultiplier is the Poisson distribution, which in turn can be approximated by a Gaussian distribution for large means. Since, for each electron reaching the scintillator, about 100 photons reach the cathode of the photomultiplier, the Gaussian approximation can be safely used for the purposes of these simulations (without limitation thereto), with as standard deviation:

$$\sigma = m_c \eta G \sqrt{\frac{1 - \eta + \frac{1}{\delta - 1}}{m_c \eta} + \frac{\sigma_c^2}{m_c^2}}$$

Additionally, the number of electrons hitting the scintillator can be modelled by the Poisson process:

$$x \leftarrow P(\alpha x), \text{ and}$$

$$x \leftarrow (x + \mathbb{N}(0, \sigma))/\alpha,$$

where α is a dose scale factor. The division over a in the later equation returns x to about its original range.

The use of short dwell times during the data acquisition process can cause fast scan noise artefacts, which appear as horizontal blurring on the recorded images. In the Fourier domain, this effect can be observed as a damping effect on the high (spatial) frequencies in the horizontal (i.e. fast/row scan) direction. This blurring is caused by the finite decay time of the detection system, e.g. of the scintillator, the photomultiplier and/or any further readout electronics. In addition to the blurring in the horizontal direction, fast scans may also introduce other artifacts due to the limited response time of the scan coils. Particularly, strong distortions may appear on the left-hand side of the images due to the discontinuity in the scan pattern between consecutive lines. This can be avoided by using a small delay (the flyback time) between scanning lines, which typically has a hardware specific optimal value. However, unfortunately, such delay adds additional dose to the sample, which typically will be localized on the left-hand side of each image.

Generally, the effect of the fast scan distortion can be modelled by a one-dimensional convolution along the fast scan direction between x and the point spread function (PSF) of the system. The inventors have found that, from detailed analysis of experimental data, the PSF of the system can be decomposed into a contribution of the detector and of the readout system, in which the PSF of the detector can be modelled by a Lorentzian function and the PSF of the readout system can be described by a damped harmonic oscillator, as the inventors have empirically determined.

Thus, the fast scan noise distortion simulation may be performed in accordance with:

$$x \leftarrow x * PSF_{detector} * PSF_{readout},$$

$$\text{with: } PSF_{detector} = \begin{cases} \frac{\alpha}{4\pi^2 k^2 + \alpha^2}, & \text{if } k \leq 0 \\ 0, & \text{if } k > 0 \end{cases},$$

$$\text{and: } PSF_{readout} = \begin{cases} e^{-k/\beta} \sin\left(\frac{2\pi k}{\gamma} + \theta\right), & \text{if } k \leq 0 \\ 0, & \text{if } k > 0 \end{cases},$$

in which k represents the pixel value in real space, α is the parameter of the Lorentzian function, and β, γ and θ are the parameters of the damped harmonic oscillator.

Row-segment (RS) noise arises due to a non-response of the detector over some pixels during the scanning process along the fast-scanning direction. This noise can be modelled by generating a random number of row segments with a random length. The pixel intensities of the lines in the image may then be replaced, x←RS(x), by their average intensity multiplied by a random factor, e.g. within the range of [0.5,1.5].

In scanning-type modalities, black pixel noise may also occur, as was also the case in the treatment of pixel array acquisition (e.g. TEM) modalities already discussed hereinabove. Such black pixels noise consists of random pixels that have significantly lower values than their neighbouring pixels, thus resulting in black spots on the image. Some black pixels might be due to loss of information during the data (and/or signal) transmission, cosmic rays and/or the non-response of the detector. Black pixel artefacts are time-dependent and can be modelled by generating a sensitivity mask ($S_{black\ noise}$) with spatially uniform distribution of a randomly sampled number of black points: x←x $S_{Black\ noise}$. However, in some embodiments, the SEM modality distortion simulation chain in a method in accordance with embodiments may, in fact, exclude such step of black pixel artefact simulation, since black spots on SEM images can also represent actual image content to preserve, e.g. may be due to pores present in a specimen. Therefore, in some embodiments, the automatic (i.e. learned) removal of such black pixel artefacts in images of this class by an artificial neural network trained in accordance with embodiments may be avoided, so as to avoid the loss of useful image content. Nonetheless, embodiments are not limited thereto, and a black pixel simulation step as discussed hereinabove may still be included in the simulation flow in accordance with an alternative embodiment of the present disclosure.

Zingers, e.g. spurious white dots appearing randomly in image, may also occur in S(T)EM modality images. As already discussed hereinabove for the TEM-like modalities, electron generated X-rays, cosmic rays and muons in particular can also produce a burst of photons in the scintillator in a SEM-like acquisition, thus leading to white spots in the image. As already discussed hereinabove, this can be modelled by generating a sensitivity mask ($S_{Zinger\ noise}$) with a spatially uniform distribution for a randomly sampled number of Zinger points. The Zinger distortion may then be added accordingly in the distortion simulation chain: x←x $S_{Zinger\ noise}$.

S(T)EM-like modalities also rely on a conversion step to generate an image in digital form, i.e. in which an analog voltage signal is read out during the final (analog signal) processing stage and quantized into discrete values using an ADC. This process introduces quantization noise, which may be modelled as already discussed hereinabove: x=round (ax), with a representing the ADC gain.

In reality, i.e. in the actual process flow from image formation and physical signal acquisition to the image or quantitative data for viewing and/or further use, postprocessing distortions are typically added after recording the image, e.g. by the data processing software and/or by user manipulation of the data. Most of the commonly encountered postprocessing distortions, such as interpolation and/or Gaussian blurring, affect the noise distribution in a non-linear manner. Other postprocessing distortions, such as adding annotations and image cropping, may replace part of the original image, and should, ideally, be preserved by the restoration process.

Interpolation distortions can occur as the result of a user interaction, e.g. by applying a transformation function to the image as received by the user/system before restoration, i.e. the distorted image. Such transformation might be needed to obtain suitable input for a further postprocessing step, for a better visualization of an area of interest and/or other case-specific goals of the user or the postprocessing flow. Such interpolation distortion may be modelled by applying a random transformation, e.g. a random linear transformation matrix, to the training image pair.

Gaussian blurring can be applied to the distorted image to improve the SNR, i.e. by eliminating high spatial frequencies. This distortion can be modelled by convolution of the distorted image with a 2D-Gaussian function with a random standard deviation within the range of [0, 1] pixel. Since the blurring is typically applied in an attempt to improve the image quality, in some embodiments, it should be removed again by the restoration process, such that the same blurring would typically not be applied to the ground-truth image of the image pair. It will be understood that, if the user's preference or a further processing flow requires a Gaussian blurring of the image after restoration, the blurring radius will likely be different than the blurring that was applied to the distorted image, such that this may need to be applied again with the appropriate setting.

Annotations might be added, e.g. by default, by the software during the visualization process and/or by the user in order to add and/or highlight information on specific areas of the image. This may typically include text, polygonal figures, circles, and arrows. These can be modelled by adding the same random annotations at the same pixel location in both the ground-truth and distorted image of the training image pair.

Another type of post-processing distortion relates to the cropping of the image by the user or in an automatic processing workflow, for example after the image has been shifted and/or rotated, e.g. to center and/or align image features of interest. Cropping may also be applied to remove one or more areas of the image, e.g. which contain irrelevant, erroneous and/or confusing data. The removed or non-overlapped areas are usually filled in by a constant value, e.g. the minimum (e.g. 0), maximum (e.g. 65535) or median of the image value range (without limitation thereto) or a specific code to represent missing data, e.g. NaN. This process can be modelled by randomly replacing the intensity value in a randomly selected area or areas in both images of the training image pair. The randomly selected area can be limited to lie outside a central square or rectangle, of e.g. 50% of the size of the total image area, to take into account that cropping or other masking operations are typically not applied to the central region, which may (typically) be already adjusted to show the main feature of interest (cf. the transformation step discussed hereinabove). Alternatives can be easily envisioned, e.g. in which the random sampling takes a distribution into account that gives a high(er) weight to peripheral regions and a low(er) or zero weight to central regions.

In summary, training data may be provided by generating 102 undistorted synthetic images, and creating distorted images 103, e.g. as a realization of stochastic variables. Post-processing distortions may be added (to one or more training samples) by applying one or more simulated post-processing distortions to the undistorted and/or distorted image of the pair, as discussed hereinabove. For example, an interpolation distortion may be simulated by applying a random transformation, e.g. a random linear transformation matrix, to the training image pair. Gaussian blurring may be simulated by convolution of the distorted image with a 2D-Gaussian function.

Furthermore, one or more random annotations may be added in both the undistorted and the distorted image of a training pair (i.e. the same randomly selected annotation or annotations may be applied to both images). Cropping distortions may be simulated by randomly replacing the intensity value in a randomly selected area or areas (e.g. rectangular box or combination of such boxes) with a constant value (which may be randomly selected as well from a plurality of predetermined typical values used to mask out areas in post-processing □ or alternatively, the value may be fixed as such), again in both the distorted and the undistorted image (i.e. the same randomly selected cropping artefact may be applied to both images of a pair). None, one or more of such post-processing distortions may be added, e.g. at random.

To provide training data that can accurately simulate different types of imaging modality, the parameters used throughout the random sampling process may be adjusted, e.g. tuned, to obtain training data that is representative for the imaging modality of interest. Some steps of the simulation process, e.g. to model specific distortions and/or image characteristics, may be enabled or disabled, in accordance with the intended imaging modality to generate. It will be understood that the deterministic execution of a specific step as opposed to the probabilistic execution of the step in accordance with a sampled probability (which may depend on the specific modality that is intended), as well as the deactivation (absence) as opposed to activation (presence) of a specific step for a specific intended modality, is entirely equivalent to setting the corresponding probability for the execution of the step to (respectively) one or zero, apart from an obvious potential difference in efficiency (e.g. implementing such degenerate probability distribution as a deterministic choice, Boolean flow control, specific optimized compilation for a specific modality, □ ).

Thus, it is particularly easy to obtain a dataset that resembles real data for a specific imaging modality, and the process can be easily reconfigured and repeated (or performed in parallel) to obtain a combined dataset with a desired number (or percentage) of each specific imaging modality of interest. It will be understood that the number of training pairs to generate for each modality of interest can be pre-selected, or the relative weight of a specific modality in the combined dataset can be pre-selected (e.g. for each pair to generate, a random choice can be made for one of the predefined processing parameters/flows for corresponding modalities in accordance with the assigned relative weights).

The inventors have found that the following parameter choices are suitable for generating training data that accurately represent the distortions encountered in practice for the indicated imaging modalities. However, it will be understood that these parameters can be changed, further optimized, or even merely adjusted for the sake of experimentation, without departing from the idea of the present disclosure. For example, specific imaging systems, restricted or extended microscope settings ranges, specimen types, and the like may be modeled by tuning the parameters to a specific intended use case. Other imaging modalities may be simulated by determining suitable parameter choices, e.g. by routine experimentation and/or common knowledge of the image formation process for that new imaging modality.

TABLE 1

| STEM distortions | probability of occurrence | sampling ranges of parameters |
| --- | --- | --- |
| Scanning jitter noise | 0.80 | $\varphi^x = [0, 0.7]$, $a^x = [2.5e-3, 0.8]$, $\varphi^y = [0, 0.7]$, $a^y = [2.5e-3, 0.75]$ |
| Detector noise | 1 | $m_c = [20, 900]$, $\eta = [0.10, 0.65]$, $\delta = [2, 8]$, $\sigma_c = [20, 900]$ |
| Fast scan noise | 0.65 | determine by random variation of the fitting model parameters |
| Row-line noise | 0.05 | length ratio = [0.025, 1.0], intensity = [0.5, 1.5] |
| Black pixel noise | 0.05 | maximum number of black pixels = [1, 3] |
| Zinger noise | 0.05 | maximum number of white pixels = [1, 4] |
| Quantisation noise | 1 | $\alpha = [8, 65535]$/mean of image |

TABLE 2

| SEM distortions | probability of occurrence | sampling ranges of parameters |
| --- | --- | --- |
| Scanning jitter noise | 0.50 | $\varphi^x = [0, 0.7]$, $a^x = [2.5e-3, 0.4]$, $\varphi^y = [0, 0.7]$, $a^y = [2.5e-3, 0.35]$ |
| Detector noise | 1 | $m_c = [30, 700]$, $\eta = [0.10, 0.55]$, $\delta = [2, 10]$, $\sigma_c = [30, 700]$ |
| Fast scan noise | 0.50 | determine by fitting process |
| Row-line noise | 0.10 | length ratio = [0.025, 1.0], intensity = [0.5, 1.5] |
| Zinger noise | 0.05 | maximum number of white pixels = [1, 2] |
| Quantisation noise | 1 | $\alpha = [8, 65535]$/mean of image |

TABLE 3

| TEM distortions | probability of occurrence | sampling ranges of parameters |
| --- | --- | --- |
| Photon shot noise | 1 | scaling factor = [0.1, 750]/mean of image |
| Fixed patter noise | 1 | $\sigma = [0.005, 0.025]$ |
| Dark-Current nonuniformity | | $\mu = [0.01, 1.0, ]$, $\sigma = [0.1, 0.50]$, $a = \mu + 5\sigma, \mu + 8\sigma$ |
| Dark-Current shot noise | 0.40 | scaling factor = [0.25, 75]/mean of image |
| Thermal noise | 0.75 | $\sigma = [0.025, 1.50]$ |
| Flicker noise | 0.75 | $\sigma = [0.025, 1.25]$ |
| Reset noise | 0.65 | $\sigma = [0.25, 1.25]$ |
| Black pixel noise | 0.50 | maximum number of black pixels = [1, 4] |
| Zinger noise | 0.50 | maximum number of white pixels = [1, 5] |
| Quantisation noise | 1 | $\alpha = [8, 65535]$/mean of image |

Distortions that are not included in one of the tables 1-3 hereinabove, may be considered absent for the specific modality to which that table relates, e.g. may equivalently be considered to have a probability of occurrence equal to zero. However, the post-processing distortions mentioned hereinabove may be applied independently of the modality, e.g. may be included, excluded, or included with a probability of occurrence, as desired and/or deemed appropriate for a specific use-case. The examples given in these tables 1-3 are not limitative.

The method 100 further comprises training 109 the artificial neural network to reduce and/or remove distortions in an image by using the distorted images as input to the artificial neural network and using the corresponding synthetic electron microscopy images as training output of the artificial neural network. This step of training 109 uses an adversarial training strategy in which the artificial neural network is trained in conjunction with a further artificial neural network. In this adversarial training strategy, the artificial neural network acts as a generator network trained to produce an undistorted image from a distorted image input, and the further artificial neural network, acting as a discriminator network, is concomitantly trained to differentiate output produced by the generator network from real images presented as input to the discriminator, i.e. to differentiate outputs of the generator from synthetic electron microscopy images in the training set.

Thus, the method 100 may comprise the training of a generative adversarial network (GAN) in which the artificial neural network is used as generator network. A GAN is a powerful framework which encourages predictions to be realistic and thus to be close to the undistorted data distribution. The training 109 may thus comprise concomitantly training an end-to-end mapping between the distorted and undistorted synthetic electron microscopy images and a loss function to train this mapping.

A GAN consists of a generator (G) and a discriminator (D) playing an adversarial game. The generator learns to produce output that looks realistic to the discriminator, while the discriminator learns to distinguish between real (i.e. the created 102 undistorted synthetic images) and the generated data (i.e. the output of the generator). The models are trained together in an adversarial manner, such that improvements in the discriminator come at the cost of a reduced capability of the generator, and vice versa.

The artificial neural network, i.e. the generator, may comprise a convolutional neural network or, generally, a network comprising a combination of convolutional and/or deconvolutional layers, and may include a residual dense network (RDN) or extension thereof. The artificial neural network may be based on a grouped residual dense network (GRDN), e.g. the concatenated grouped residual dense network (CGRDN) discussed hereinbelow. For example, a suitable architecture may be a modified DenseNet (DN) architecture generator, specifically adapted for the purpose of electron microscopy image restoration, further referred to as the concatenated grouped residual dense network (CGRDN).

This illustrative network architecture is an extension of the grouped residual dense network (GRDN) for image denoising, which was ranked first for a real image denoising task based on a peak SNR measure, as well as based on a structure similarity index measure, as tested in the NTIRE 2019 Image Denoising Challenge, cf. Ignatov et al, ⬜NTIRE 2019 challenge on image enhancement: Methods and results,⬜ In IEEE Computer Society Conference on Computer Vision and Pattern Recognition Workshops, volume 2019-June, pp. 2224⬜2232. More details regarding the GAN and GRDN approach can be found in Kim et al, ⬜GRDN: Grouped residual dense network for real image denoising and GAN based real-world noise modelling,⬜ in IEEE Computer Society Conference on Computer Vision and Pattern Recognition Workshops, volume 2019-June, pp. 2086⬜2094 (same issue as aforementioned reference).

Although an architecture developed for a certain image restoration task may also perform well for other restoration tasks, an architecture may be tuned to a given task in a data-dependent manner for even better results for that specific application. When applied to electron microscopy data, the inventors have found that two modifications of GRDN may be used to improve results in view of the specific nature of this data, which may involve different types and levels of noise and/or distortions with potentially high correlations between pixels. In other words, embodiments of the present disclosure are not necessarily limited to a GRDN architecture and/or a modification or modifications as discussed hereinbelow, but it has been found that particularly good results can be obtained with the specific proposed strategy nonetheless.

As a first optional modification of a conventional GRDN structure, the cascading of the GRDN may be enhanced by feature concatenation of outputs of the GRDNs, feature fusion 18 and a semi-global residual connection. This allows hierarchical features to be exploited in a global way, which may compensate distortions in which highly correlated pixels extend over a large area of the image, e.g. SEM jitter effects.

As a second optional modification, may but not necessarily applied in combination with the aforementioned first optional modification, the convolution block attention module (CBAM), as implemented for the NTIRE 2019 (see reference provided hereinabove), may be removed, since relatively large image sizes may be typically used for training, e.g. 256×256, which would reduce its gain.

Figure 3:
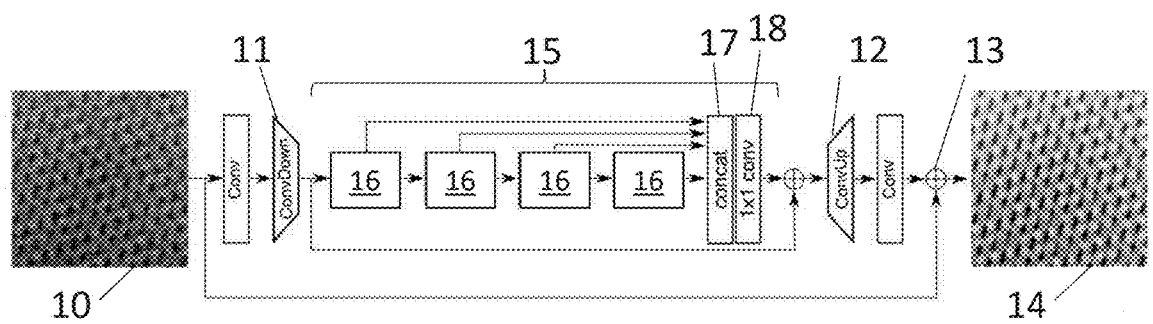
FIG. 3 shows an illustrative neural network architecture of an artificial neural network in accordance with embodiments of the present disclosure, e.g. as can be trained by a method in accordance with embodiments.

An illustrative neural network architecture of the artificial neural network, i.e. the generator, is shown in FIG. 3, corresponding to the concatenated grouped residual dense network (CGRDN) approach discussed hereinabove.

The generator receives, as input, a distorted electron microscopy image 10 (e.g. in training, the input image of a training pair, and in use after training, the image to restore). The input is provided to a down-convolutional layer 11, which corresponds to an up-convolutional layer 12 to determine the correction to apply (e.g. additively 13) to obtain the output image, i.e. the restored electron microscopy image 14 (e.g. in training, the output image of the training pair, and, in use, the desired output with reduced distortions).

The main part 15 of the generator comprises a plurality (e.g. four, without limitation thereto) of (hierarchical) layers of grouped residual dense blocks (GRDB) 16, in which the outputs of the layer are concatenated, convoluted and recombined with the input received from the down-convolution 11 before passing through the up-convolution 12 toward the output.

Figure 4:
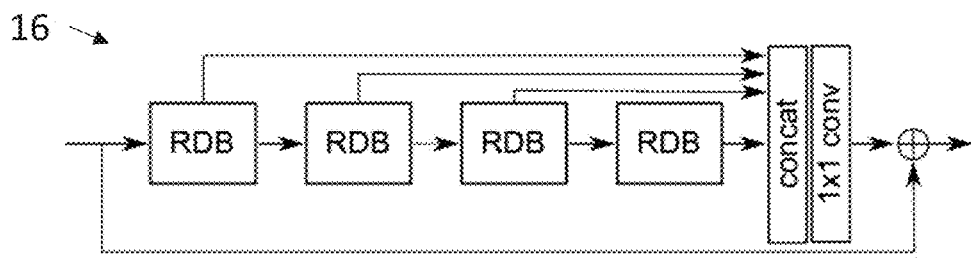
FIG. 4 shows a grouped residual dense block (GRDB), as may be included in an artificial neural network in accordance with embodiments of the present disclosure, e.g. in a network as illustrated in FIG. 3.

Each GRDB 16 follows a similar structure at a lower hierarchical level as this main part 15, as can be seen in FIG. 4, with a plurality of residual dense block RDB layers.

Figure 5:
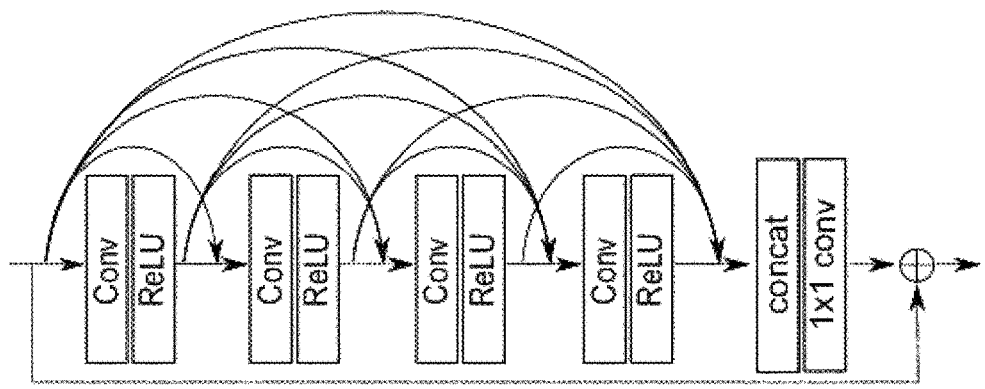
FIG. 5 shows a residual dense block (RDB), as may be included in an artificial neural network in accordance with embodiments of the present disclosure, e.g. as may be used in a GRDB as shown in FIG. 4.

Finally, each residual dense block is constructed as shown in FIG. 5, and is adapted to extract local features via dense connected convolutional layers. By passing state (cf. also FIG. 3) from the preceding RDB to all layers (e.g. each comprising a convolution Conv and a rectified linear unit ReLU) of the current RDB, a contiguous memory mechanism is realized. Local feature fusion can thus adaptively learn from the preceding state and local features, such that a stable behavior is achieved over the wider network structure.

In the training step 109, the artificial neural network to train (e.g. the CGRDN discussed hereinabove) is complemented by a further artificial neural network, e.g. a discriminator network. The discriminator network is adapted (i.e. trained) to evaluate the quality of the output data generated by the generator network.

While embodiments may rely on various generator network architectures while still achieving good results, an illustrative generator network is discussed hereinbelow. The inventors have found that the proposed discriminator architecture can achieve good quality in restoring images using the ANN, trained in conjunction with the discriminator, and results in stable and robust training behavior.

Figure 6:
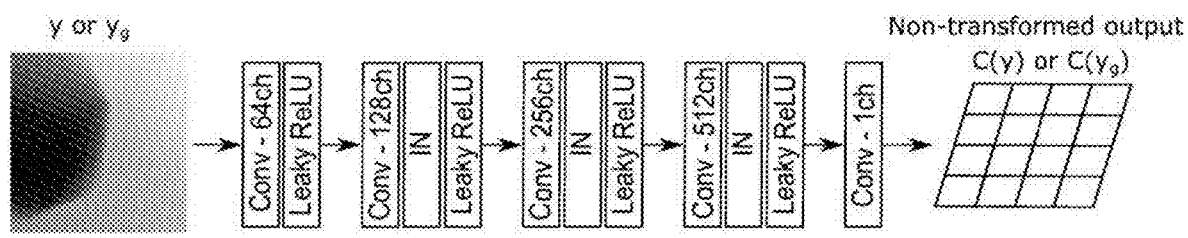
FIG. 6 illustrates a discriminator neural network for use in a method in accordance with embodiments of the present disclosure, e.g. to train in conjunction with an artificial neural network in accordance with embodiments of the present disclosure.

The illustrative discriminator may correspond to the 70×70 convolutional patch discriminator described by Isola et al, ⬜Image-to-Image Translation with Conditional Adversarial Networks,⬜ in Proceedings 30th IEEE Conference on Computer Vision and Pattern Recognition, CVPR 2017, pp. 5967⬜5976, with some minor differences: the zero-padding layers were removed and the batch normalization layers were replaced by instance normalization layers IN. This results in a serial layer group (or stack) structure, in which in each layer group a convolutional layer, an instance normalization layer and a leaky rectified linear unit are applied (except for the first and last layers, which are structured as shown in FIG. 6). It will be understood that the choice of dimensions (e.g. 70×70) is not required, e.g. can be adjusted as needed or deemed useable in embodiments of the present disclosure.

FIG. 6 schematically shows the structure of the illustrative (patch) discriminator network, which outputs a non-transformed output C(y) from a training (⬜real⬜) undistorted image y and $C(y_g)$ from an output image that is generated $y_g$ by the generator network. In this illustrative approach, the non-transformed output has dimension 32×32. However, the skilled person would understand that (input/output/intermediate) data dimensions, layer sizes, number of layers and/or other such parameters of neural network architectures may be varied while still good results might be obtained, e.g. while still achieving substantially the same effect(s).

In some embodiments, the discriminator may use a Relativistic GAN approach, which may improve data quality and stability of GANs without an additional computational cost. Whereas a conventional discriminator estimates the probability that input data is real (as opposed to generated by the generator network), a relativistic discriminator predicts the probability that real data y is relatively more realistic than generated data $y_g=G(x)$, i.e. for any given training pair (x,y), the discriminator evaluates the realism of $y_g=G(x)$ relative to the corresponding reference (undistorted) image y. If the conditional relativistic average patch discriminator is denoted as $D_{Rap}(\bullet)$, then the output of the discriminator can be written as:

$$D_{Rap}(y, y_g) = \sigma(C(y) - \mathbb{E}_{y_g}\{C(y_g)\})$$

$$D_{Rap}(y_g, y) = \sigma(C(y_g) - E_y\{C(y)\})$$

where $\sigma(\bullet)$ is the sigmoid function and $\mathbb{E}_v\{\bullet\}$ is an operator representing the expectation value computed on the variable v.

As already mentioned, the step of training 109 the artificial neural network to reduce and/or remove distortions in an image uses an adversarial training strategy. The adversarial training strategy is implemented by a loss function for training the artificial neural network, i.e. the generator, and a loss function for training the further neural network, i.e. the discriminator, with at least a cross-dependency in either or both loss functions that represents a contribution (e.g. inversely signed term) from the other loss function such that both neural networks can be concomitantly trained in an adversarial manner. However, the training step may optionally be initiated with a training of the generator network using the generator loss function with this interdependency excluded, e.g. to bootstrap the generator network while avoiding learning instabilities, and include the adversarial cross-dependency only at a later training stage.

The loss functions can thus be considered to be the effective driver of the network's learning. The goal of the loss functions is to map a set of parameter values (e.g. characteristics) of the network onto a scalar value, such that candidate solutions (e.g. different sets of generator and discriminator parameter values representing different network realizations) can be ranked and compared.

The discriminator and adversarial loss function components may be based on the relativistic average GAN loss function approach, as described by Jolicoeur-Martineau, ⁋ The relativistic discriminator: A key element missing from standard GaN,⌊ in 7th International Conference on Learning Representations, ICLR 2019. International Conference on Learning Representations, ICLR (July 2019).

For example, the step of training 109 the networks may use a numeric optimizer, e.g. a gradient descent method or a more refined variation thereof, e.g. the Adam optimizer, as known in the art. This optimizer Is used to evolve the realizations of both networks toward lower values of the corresponding loss functions, i.e. to minimize the loss functions.

As mentioned, in an initial training phase 110, the generator network (or both networks) may be initialized without adversarial loss contribution(s), e.g. as warmup for the network(s). For example, the generator may first be trained in isolation, e.g. first only to minimize an $L_1$ loss function discussed further hereinbelow, and then (e.g. after sufficient warming up by iteratively minimizing the $L_1$ term) to minimize a pixel-based loss (discussed further hereinbelow). In some embodiments, it will be understood that the generator network is initialized before the discriminator network, since the latter depends on the output of the former for (at least some) of its input. This initialization 110 may optionally repeat for a few iterations, e.g. alternating between training the generator and the discriminator network.

In a further training phase 111, both the generator and discriminator networks may be trained in conjunction in an adversarial manner, e.g. using a gradient descent in the parameters of both networks simultaneously for the combined loss functions (e.g. the sum of generator and discriminator losses with at least one thereof comprising a dependency on the other, or, equivalently, the sum comprising a further non-separable term), or gradient descent steps for each of the generator and discriminator networks may alternate (in which at least one loss function for either network or both networks comprises a dependency on the other network or other loss function). Again, even though reference is made to gradient decent steps, it will be understood that the optimizer may use an alternative optimization strategy to the same effect, and/or may use a more intricate algorithm than straightforward gradient descent (e.g. the Adam optimizer referred to hereinabove).

The generator loss function may comprise a combination, e.g. sum, of different contributions, aiming to avoid or reduce the loss of (useful) quantitative information of the image at the pixel level and to produce perceptually correct and realistic images.

The generator loss function may comprise an $L_1$ (or taxicab, or Manhattan) loss contribution representative of pixel-based losses, e.g. penalizing deviations between the restored image output and the training (ground truth) undistorted synthetic image, in order to keep quantitative information of the ground truth image. The inventors have found that an $L_1$ loss function (contribution), while generally similar in form and function to an $L_2$ loss function, can yield less blurred results compared to an $L_2$ loss term. The $L_1$ loss can be written as:

$$\mathcal{L}_1 = \mathbb{E}_{y,y_g}\{w_y\|y - y_g\|\}$$

$$w_y = 1/\max(\sigma_{min}, Std_y\{y\})$$

where y and $y_g$ represent the training ground-truth undistorted synthetic image and the generated output of the generator network (for the training distorted image input corresponding to the ground-truth image, i.e. of the same training image pair), $w_y$ is a weighting factor to give equal importance to each training sample independent of its contrast, $\sigma_{min}$ is a (generally small) value to limit the maximum scaling factor, $\mathbb{E}_v\{\bullet\}$ represents the expectation value operator for the variable (or combination of variables) v, and $Std_v\{\bullet\}$ is an operator representing the standard deviation computed on the variable or variables v. It will be understood by the skilled person that the normalization of the weighting factor $w_y$ may alternatively be removed or replaced by another suitable approach to avoid large differences in loss weights between different training samples without inventive effort. In other words, while an $L_1$ loss is obviously defined by its dependence on an $\|y-y_g\|$ metric, variations, extensions and/or tuning of its exact implementation, e.g. of the weighting thereof, are considered to generally lie within the competence of the skilled person.

Particularly in view of the generator network structure as proposed hereinabove, in which (substantively) a residual difference is learned between the distorted (input) and undistorted (output) image, it may be useful to include (e.g.

alternatively or additionally to a $L_1$ loss) an $L_2$ (or Euclidean) loss contribution in the generator loss function. For example, a distorted image can have strong outliers in the distribution of pixel intensities (such as due to X-rays hitting the electron microscopy detector, saturation of the detector, low dose and/or dead pixels), such that the output of the generator could show strong correlation at those pixel positions. At low doses, detection by counting can produce relatively large values due to the long tails of the Poisson distribution, such that these large values can appear similar to outliers and can be treated substantially in the same manner (even if technically not being outliers as such). Therefore, it may be beneficial to an $L_2$ loss (in some embodiment, in combination with also an $L_1$ loss), which more strongly penalizes outliers than an $L_1$ metric:

$$\mathcal{L}_2 = \mathbb{E}_{y,y_g}\{w_y\|y - y_g\|^2\}$$

In this $L_2$ loss, a similar (or the same) weighting factor $w_y$ may be used as discussed hereinabove. However, this is not necessarily the case for all embodiments, and variations on the specific form of the $L_2$ loss (characterized by its dependence on the $(y-y_g)^2$ metric) may be envisioned by the skilled person without requiring an inventive effort, as already discussed hereinabove for the $L_1$ loss.

It will be understood that principles of the present disclosure may be applied by using another pixel-based loss metric or combination of metrics, e.g. including the infinity (or maximum) norm $L_\infty$, the nth power norm Ln (for integer n>2) and the p-norm Lp (for real p≥1), and/or potentially even metric-like measures (e.g. the zero norm $L_0$, the $L_p$ norm for 0<p<1, ▯).

The generator loss function may comprise, in addition to the pixel-based loss contribution or contributions as discussed hereinabove, a multi-local whitening transform loss contribution. Local contrast normalization (LCN) is a method which normalizes the image on local patches on a pixel basis. A special case of this method is the whitening transform which is obtained by subtracting the mean and dividing by the standard deviation of a neighborhood from a particular (i.e. at each) pixel:

$$y^S_{i,j} = (y_{i,j} - E_{\hat{S}}\{y_{i,j}\})/\max(\sigma_{min}, Std_y\{y_{i,j}\})$$

where $\hat{S}$ represents a local neighborhood around the pixel i,j having a window size S. The whitening transform makes image patches less correlated with each other and can highlight image features that were hidden in the raw image due to a low local contrast. A multi-local whitening transform (MLWT) loss may thus be used to give more weight to fine details independently of the local intensity range. Specifically, the generated image $y_g$ and the ground truth image y may be transformed by one or more local whitening transforms, e.g. for different window sizes (e. 2×2, 4×4, 8×8, and 16×16), and, then, one or more of the pixel-based losses (e.g. $L_1$, $L_2$, ▯) discussed hereinabove may be applied. For example, the average $L_1$ loss for these 4 local neighborhood ranges (transformed image pairs) may be used, e.g.:

$$\mathcal{L}_{mlwt} = \frac{1}{4} \sum_{S=2,4,8,16} \mathbb{E}_{y^S, y_g^S}\{\|y^S - y_g^S\|\}$$

By using different windows sizes for the calculation of the whitening transform(s), relevant features present in the image may be detected independently of a local feature size (i.e. a region sharing a similar contrast).

It will be understood that the shape of the neighborhood may be square, but may also be another suitable neighborhood, e.g. a diamond, disc or any other suitable neighborhood shape, and/or that the number and/or size of the windows may vary. It will also be understood that the same principle may be applied while using a different metric, e.g. $L_2$, ▯, or a combination of different metrics. While the MLWT losses at different window sizes are in this example equally weighted by the averaging (e.g. the ¼ factor), this is not necessarily the case. For example, each MLWT term (for a specific window size) may be included in the total loss function independently, e.g. with a tunable and/or trainable weight for each window size. It is also noted that, viewed from a different perspective, the pixel-based loss or losses ($L_1$, $L_2$, ▯) discussed hereinabove may be considered as a trivial extension of the MLWT loss (for neighborhood size 1, that is). Therefore, the generator loss function may comprise, in general terms, one or more terms (or other contributions) that accumulate pixelwise distances, in the sense of one or more metrics, between the training synthetic undistorted image and the output image generated by the artificial neural network (generator G) and/or between said undistorted and generated images after applying a multi-local whitening transformation.

For electron microscopy images, it may be important to note that the Fourier space will typically contain information about the imaged specimen that could be of interest, e.g. in quantitative analysis of the image. The Fourier space may be affected by distortions, which are not always easy to visualize or possibly even noticeable in real space. Therefore, the generator loss function may also comprise a loss contribution calculated in the Fourier domain. For example, an $L_\gamma$ loss may be applied to the two-dimensional Fourier transform $\mathcal{F}$ (e.g. Fast Fourier Transform) of the difference between generated image $y_g$ and the ground truth image y:

$$\mathcal{L}_{fs-\gamma} = \mathbb{E}_{y,y_g}\{\|\mathcal{F}(y - y_g)\|^\gamma\}$$

The same caveats as mentioned hereinabove may apply equally: e.g. the specific choice of norm that is used for a Fourier-space loss contribution may vary, and/or straightforward extensions and/or modifications may be contemplated, e.g. to approximatively normalize the loss contribution between different training examples. It will also be understood that the difference of Fourier transforms may alternatively be used ($\mathcal{F}$ (y)–$\mathcal{F}$ ($y_g$) instead of $\mathcal{F}$ (y–$y_g$)), or similar modifications that do not deviate substantially from the underlying concept. In this example, a generic p-norm is used, in which a parameter choice p=γ of 0.125 was found to produce good results. This is, however, not limitative, and another value for γ and/or another metric may be used alternatively.

In addition to Fourier space fidelity, the total intensity and the standard deviation of images may be important parameters in deriving quantitative information from electron microscopy images. Such basic statistics can carry important information about physical quantities of the sample and/or the microscope system (and/or settings thereof), such as the total number of atoms, defocus, spatial incoherence and/or temporal incoherence. Therefore, in some embodiments, the loss function may include a contribution to encourage that the restored images preserve these statistical measures. For example, $\mathcal{L}_{mean}=\|\mathbb{E}_y\{y\}-\mathbb{E}_{y_g}\{y_g\}\|$ and/or $\mathcal{L}_{std}=\|\text{Std}_y\{y\}-\text{Std}_{y_g}\{y_g\}\|$ may be included as loss function contributions (e.g. terms).

Again, the specific choice of metric may vary, e.g. an L2 or other norm may be used alternatively in these equations (and not necessarily the same norm for each), and additional modifications may be contemplated to scale, normalize or otherwise condition the behavior of the loss function contribution. Also, the skilled person may consider extending or replacing the constrained statistic or statistics without exerting an inventive effort. For example, further (or alternative constraints) can easily be formulated for other measures, such as the median, the maximum intensity, the minimum intensity, the interquartile range, one or more specific percentiles, skew, kurtosis, and/or any other such measure that would be deemed relevant.

In at least some training iterations (e.g. in view of the initial and further phases 110, 111 discussed hereinabove, without necessarily limiting thereto), the generator loss function also comprises a contribution (e.g. term) representative of the adversarial loss, e.g. a relativistic (see e.g. the use of this term in the reference cited hereinabove) adversarial loss contribution. The goal of such (relativistic) adversarial loss is to fool the discriminator, i.e. to reward the generator for generating images that cannot be distinguished by the discriminator from real training examples. A relativistic adversarial loss contribution may be expressed as:

$$\mathcal{L}_{Adv} = -\mathbb{E}_{x,y}\{\log(1-D_{Rap}(y, y_g))\} - \mathbb{E}_{y_g}\{\log(D_{Rap}(y_g, y))\}$$

with $D_{Rap}(y,y_g)$ and $D_{Rap}(y_g,y)$ as defined earlier hereinabove (cf. discussion regarding Relativistic GAN approach). This definition is based on the binary cross-entropy between the ground truth and generated images, however, it will be understood that an alternative loss measure may also (additionally or alternatively) be used, e.g. a measure known in the art that is suitable for expressing a binary classification performance.

Note the negative sign in this expression, which emphasizes that the generator network is rewarded for poor performance of the discriminator network. Obviously, this presumes that the different loss function contributions are compounded by a simple addition (possibly with tunable and/or trainable weight factors that are positive-valued). While composition by summation may be used, e.g. particularly when a gradient descent or similar approach is used, it is to be noted that embodiments are not necessarily limited thereto. For example, the loss function contributions may also be compounded by multiplication, summing over logarithms of the various contributions (loss function components), combination of powers of the contributions, and/or any other suitable approach to function composition, and/or a combination of different composition approaches. It will be clear to the skilled person that for different approaches to function composition, the contrary effect of the adversarial contribution may need to be taken into account in another suitable manner, e.g. the negative signs in the expression hereinabove may need to be replaced by another suitable mechanism to achieve an overall counteracting effect of the adversarial component relative to the other loss function components.

Where reference was made hereinabove to an initial training phase and a further training phase, in which the adversarial component is only added to the loss function after the initial training phase, it will be clear that an alternative strategy may be envisioned that achieves substantially the same effect by assigning a weight to the adversarial component that generally increases (e.g. from zero) during training, e.g. such that the training procedure may be implemented in a simpler manner and/or such that a gradual transition between non-adversarial and adversarial training avoids instabilities and/or entrapment in local optima of the loss function in the parameter space.

The total generator loss function may thus, for example, be expressed as:

$$\mathcal{L}_G = \mathcal{L}_{pixel-based} + \lambda_{Adv}\mathcal{L}_{Adv}$$

with, for example:

$$\mathcal{L}_{pixel-based} = \lambda_1\mathcal{L}_1 + \lambda_2\mathcal{L}_2 + \lambda_{mlwt}\mathcal{L}_{mlwt} + \lambda_{fs-\gamma}\mathcal{L}_{fs-\gamma} + \lambda_{mean}\mathcal{L}_{mean} + \lambda_{std}\mathcal{L}_{std}$$

where $\mathcal{L}_{pixel-based}$ is the pixel-based loss function, and $\lambda_1$, $\lambda_2$, $\lambda_{mlwt}$, $\lambda_{fs-\gamma}$, $\lambda_{mean}$, $\lambda_{std}$ and $\lambda_{adv}$ are weighting parameters to balance the different loss terms.

Corresponding to (e.g. balanced by) the (e.g. relativistic) adversarial loss component of the generator loss function, the (e.g. relativistic) discriminator loss function aims to predict the probability that real data is (e.g. relatively) more realistic than generated data, and can be expressed as:

$$\mathcal{L}_D = -\mathbb{E}_{x,y}\{\log(D_{Rap}(y, y_g))\} - \mathbb{E}_{x,y_g}\{\log(1-D_{Rap}(y_g, y))\}$$

Figure 7:
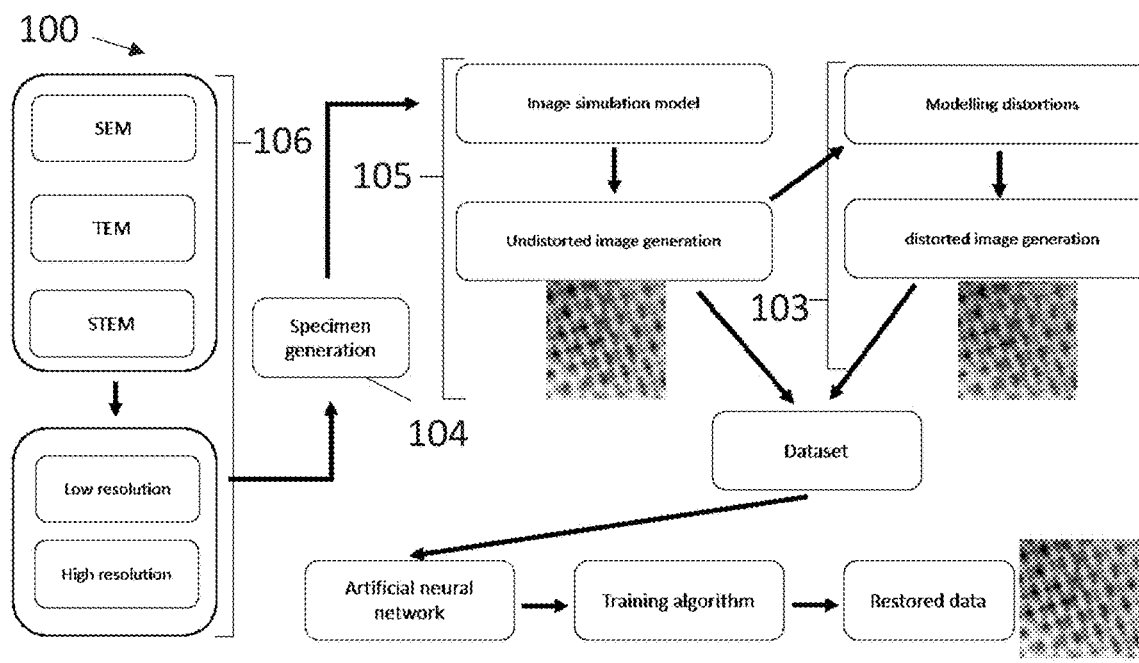
FIG. 7 shows a schematic diagram of a workflow as may be implemented by a method in accordance with embodiments of the present disclosure.

To summarize, FIG. 7 shows a further illustrative diagram of a method 100 in accordance with embodiments of the present disclosure. The method may generate 101 training data for different electron microscopy modalities, e.g. SEM, TEM and STEM (without limitation thereto), and at different resolutions, e.g. low resolution and high resolution (without limitation thereto). For example, the generation 101 of a training data image pair may start with (e.g. randomly) selecting 106 a modality and resolution to simulate. The generation 101 of a training data image pair comprises the creation 102 of an undistorted synthetic image by a specimen simulation process 104 and an image formation (of the specimen) simulation process 105. Then, a distorted image may be created 103 from the undistorted synthetic image by simulating various sources of noise and artefacts, as may be encountered in practice.

The dataset thus obtained by generating a plurality of training image pairs is fed to the artificial neural network, which, by applying a training algorithm as discussed hereinabove, learns to produce restored image data from distorted image data when received as input, e.g. such that the restored image data is more similar to an undistorted image while aiming to preserve the useful image content of the distorted image.

The present disclosure further relates to the trained artificial neural network thus obtained, e.g. in a device, in a computer-program product, on a computer-readable data carrier and/or in the form of a data carrier signal.

In a second aspect, the present disclosure relates to an artificial neural network for reducing noise and/or artefacts in an electron microscopy image, in which the artificial neural network is trained by a method in accordance with embodiments of the first aspect of the present disclosure. Thus, the ANN may be used (by evaluation, i.e. execution, of the ANN with an electron microscopy image as input) to reduce (e.g. remove) noise and/or artefacts in an electron microscopy image, e.g. in transmission electron microscopy (TEM), scanning electron microscopy (SEM) and/or scanning transmission electron microscopy (STEM) images.

In a third aspect, the present disclosure relates to a computer-program product for, when executed by a processor or computer, evaluating the artificial neural network in accordance with embodiments of the second aspect of the present disclosure to produce a restored electron microscopy image from an input electron microscopy image.

In a fourth aspect, the present disclosure relates to a data carrier and/or signal comprising data corresponding to a computer-readable, e.g. computer-executable, representation of the artificial neural network in accordance with embodiments of the second aspect of the present disclosure.

In a fifth aspect, the present disclosure relates to a data signal, e.g. a data communication network transmission, comprising data corresponding to a computer-readable, e.g. computer-executable, representation of the artificial neural network in accordance with embodiments of the second aspect of the present disclosure.

To illustrate embodiments of the present disclosure, tests were performed to demonstrate the learning approach and network architecture discussed hereinabove. For these experiments, training data was generated, consisting of pairs of undistorted synthetic electron microscopy images and corresponding distorted images, in accordance with the data generation procedures discussed hereinabove.

For the artificial neural network architecture, already discussed in detail hereinabove, 4×4 filters were used for the up- and down-convolutional layers (12, 11), and stride 2 and 1×1 filters were used for feature fusion in each RDB block (see FIG. 5). Otherwise, 3×3 filters were used with stride 1 throughout the network. Zero-padding was used for all convolutional layers. Each RDB has a growth rate of 32 channels (cf. indicated channels in FIG. 6, however without limitation of embodiments to this example), 8 pairs of convolutional layers and ReLU activation. The initial convolution layer outputs 64 channels and the final convolutional layer has 1 output channel.

These network architecture parameters, e.g. the initial convolution layer output, growth rate and the number of convolutional layers in each RDB, were determined in view of a trade-off between the accuracy and hardware constraints imposed by the processing system used for performing these illustrative tests. However, it will be understood that such constraints may vary from system to system, and/or other routine design choices and/or preferences may be applied by the skilled person without exerting an inventive effort.

The above parameters produce a model of 152 layers with 7.04M parameters. For the present illustrative experiments, the model was implemented using the TensorFlow 2.6 framework and trained using an NVIDIA GTX Titan Volta GPU. The learning policy chosen for these illustrative experiments was based on the Adam optimizer with $\beta_1=0.5$, $\beta_2=0.999$, and $\epsilon=10^{-5}$, and was divided in three stages.

In the non-adversarial first part, the generator network is trained to minimize the $L_1$ loss for 2 epochs with a learning rate of $5\times10^{-5}$. To prevent training instability and entrapment in local optima, the learning rates were warmed up for $65\times10^3$ steps. This was followed by a second non-adversarial part, in which the generator is trained to minimize the pixel-based loss term $\mathcal{L}_{pixel\ based}$, as discussed hereinabove, with $\lambda_2=1.0$, $\lambda_{mlwt}=0.25$, $\lambda_{fs-y}=0.10$, $\lambda_{mean}=1.0$ and $\lambda_{std}=0.5$. At this stage, the network was trained for 2 more epochs with a learning rate of $2.5\times10^{-5}$.

In the third part, the generator is trained in adversarial manner, in combination with the discriminator, as part of the GAN, to produce realistic images with $\lambda_{adv}=2\times10^{-5}$. A learning rate of $1.25\times10^{-5}$ and $2.5\times10^{-5}$ were used at this stage for the generator and the discriminator, respectively, and halved at each epoch. For the adversarial training, a standard approach was followed, in which a gradient descent step on the discriminator network and a gradient descent step of the generator network are alternated. In this part, the network was trained for 3 epochs.

The mini-batch size was set to 4. Each of the 6 datasets contains 2.5M training examples with spatial size of 256× 256.

Figure 8:
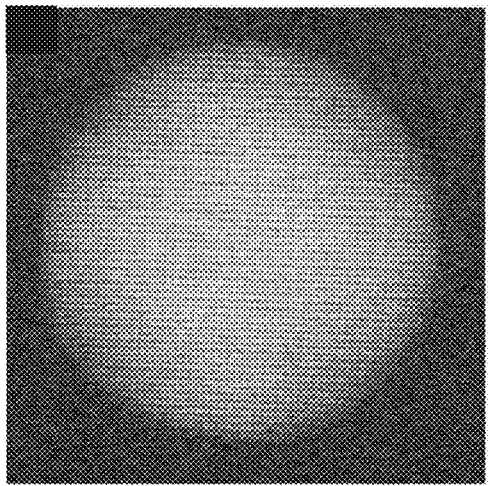
FIG. 8 shows, from left to right, a raw STEM image of a platinum (Pt) nanoparticle in a gas holder, and the corresponding restored image obtained by an artificial neural network in accordance with embodiments of the present disclosure.
Figure 8:
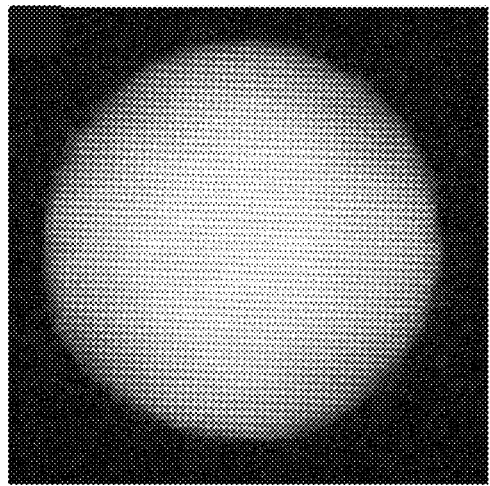
Figure 9:
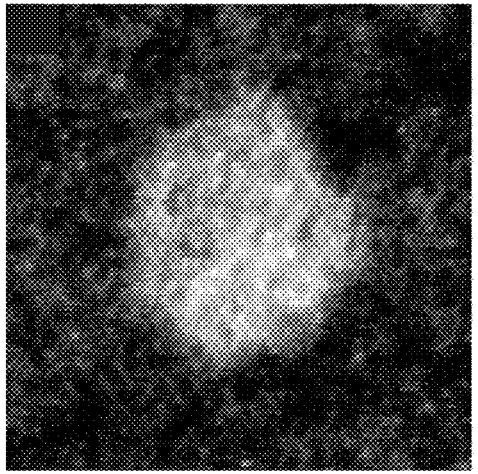
FIG. 9 shows respectively (left to right) a raw STEM image of a silver (Ag) nanoparticle embedded in an aluminium (Al) matrix and the corresponding restored data obtained by an artificial neural network in accordance with embodiments of the present disclosure.
Figure 9:
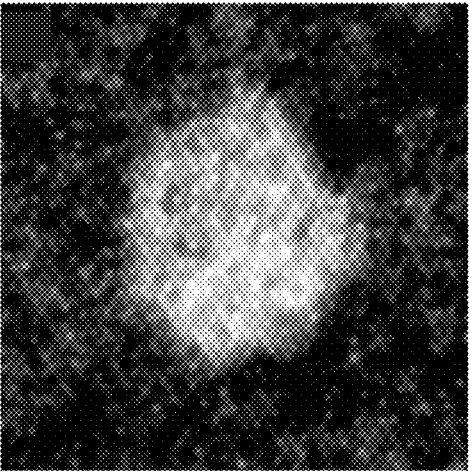
Figure 10:
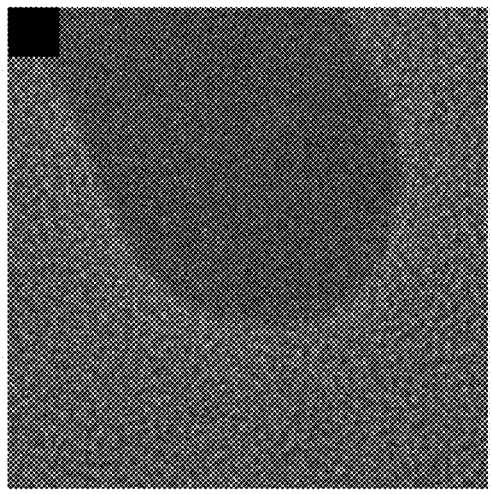
FIG. 10 shows respectively (left to right) a raw HRTEM image of a gold (Au) nanorod and its restored counterpart obtained by an artificial neural network in accordance with embodiments of the present disclosure.
Figure 10:
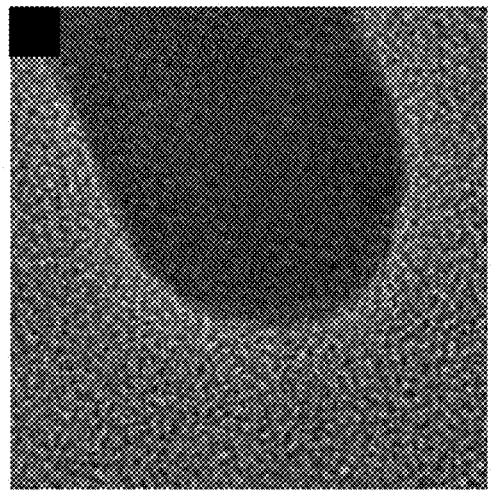
Figure 11:
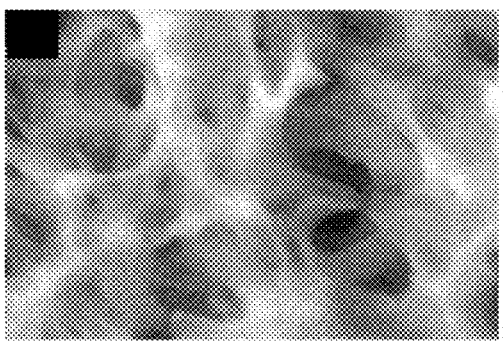
FIG. 11 shows respectively (left to right) a raw SEM image of a porous polyethylene material and the corresponding restored image obtained by an artificial neural network in accordance with embodiments of the present disclosure.
Figure 11:
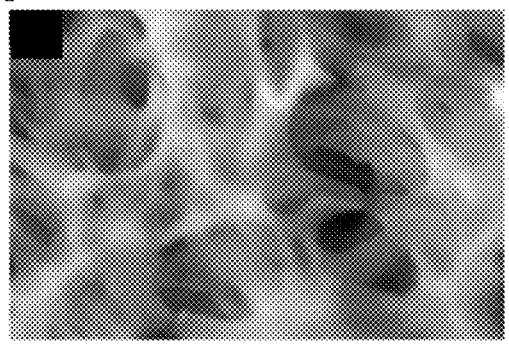
Figure 12:
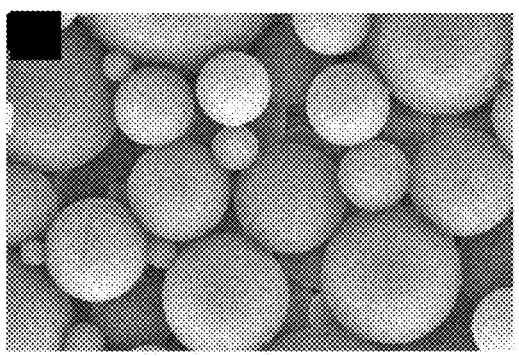
FIG. 12 shows respectively (left to right) a raw SEM image of freeze-dried pharmaceutical capsules (poly-lactic-co-glycolic acid) and the corresponding restored image obtained by an artificial neural network in accordance with embodiments of the present disclosure.
Figure 12:
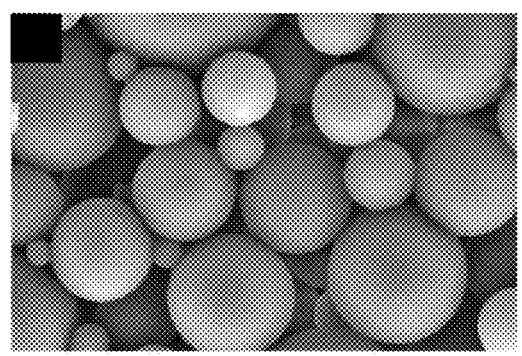

The trained artificial neural network (generator network) was tested on a variety of experimentally acquired images, to demonstrate the quality and versatility of the ANN-based image restoration process. FIG. 8 shows, from left to right, a raw STEM image of a platinum (Pt) nanoparticle in a gas holder, and the corresponding restored image using the ANN in accordance with embodiments of the present disclosure. FIG. 9 shows respectively (left to right) a raw STEM image of a silver (Ag) nanoparticle embedded in an aluminium (Al) matrix and the corresponding restored data. FIG. 10 shows respectively (left to right) a raw HRTEM image of a gold (Au) nanorod and its restored counterpart. FIG. 11 shows respectively (left to right) a raw SEM image of a porous polyethylene material and the corresponding restored data. FIG. 12 shows respectively (left to right) a raw SEM image of freeze-dried pharmaceutical capsules (poly-lactic-co-glycolic acid) and the corresponding restored image.

The invention claimed is:

1. A method for creating a distorted image from an undistorted synthetic electron microscopy image for use as a training input for training an artificial neural network, the method comprises:
   a step of creating said distorted image from the synthetic image by simulating additional noise and artefact features in the image,
   a step of selecting from at least a direct image formation modality and a scanning modality,
   in which creating the distorted image comprises, when the direct image formation modality is selected, simulating at least a camera modulation transfer function and a readout noise model, and a photon shot noise model, a fixed-pattern noise model, and/or a dark-current noise model,
   in which creating the distorted image comprises, when the scanning image formation modality is selected, simulating a scanning jitter model, a detector noise model, a fast scan noise model, a row-line noise model, a black pixel noise model, a Zinger noise model, and/or a quantization noise model.

2. The method according to claim 1, wherein the method comprises the step of creating undistorted synthetic electron microscopy images that include:
   scanning image formation modality and direct image formation modality,
   images of different specimen atomic sizes, atomic distances, atomic vibrations, lattice parameters and relative intensities between atomic species, and images corresponding to different microscope settings and/or properties, including at least different acceleration voltages, magnifications and detection system transfer functions.

3. The method according to claim 1, wherein simulating the fast scan noise model comprises applying a one-dimensional convolution along the fast scan direction between the image pixels (x) and a point spread function (PSF), wherein said PSF is composed of two component PSFs, such that x←x*PSF$_{detector}$*PSF$_{readout}$, wherein said two component PSFs are expressed by:

$$PSF_{detector} = \begin{cases} \dfrac{\alpha}{4\pi^2 k^2 + \alpha^2}, & \text{if } k \le 0 \\ 0, & \text{if } k > 0 \end{cases}, \text{ and}$$

$$PSF_{readout} = \begin{cases} e^{-k/\beta}\sin\left(\dfrac{2\pi k}{\gamma} + \theta\right), & \text{if } k \le 0 \\ 0, & \text{if } k > 0 \end{cases},$$

in which k represents the pixel value in real space, $\alpha$ is a parameter of the Lorentzian function, and $\beta$, $\gamma$ and $\theta$ are parameters of the damped harmonic oscillator.

4. The method according to claim 1, wherein the undistorted synthetic electron microscopy image is defined as: $y = \Sigma_i f^i(|r-r_i|)$, wherein:
   y is the undistorted synthetic electron microscopy image;
   f(r) is a two-dimensional radial symmetric function of a projected atomic signal;
   i refers to an atom in the specimen representation;
   r is a two-dimensional vector.

5. The method according to claim 4, wherein f(r) is a weighted sum of a Gaussian, an Exponential and a Butterworth function:

$$f_Z(r) = h_1 e^{-\dfrac{r^2}{2r_m^2}} + h_2 e^{-\dfrac{r}{r_m}} + \dfrac{h_3}{1+\left(\dfrac{r}{r_m}\right)^{2n}},$$

where $h_1$, $h_2$, $h_3$, n and $r_m$ are positive values and the parameters of the model, and where fz(r) is a radial function that models a projected atomic signal with atomic number Z.

6. A method for training an artificial neural network to reduce noise and/or artefacts in an electron microscopy image, the method comprising:
   generating a plurality of training image pairs, wherein, for each training image pair, an undistorted synthetic electron microscopy image of a simulated specimen is created and a distorted image is created from said undistorted synthetic electron microscopy image by simulating noise and/or artefact features, and
   training the artificial neural network to reduce and/or remove the noise and/or artefacts in an electron microscopy image, in which the distorted images are used as training input to the artificial neural network and the corresponding undistorted synthetic electron microscopy images are used as training output of the artificial neural network,
   wherein said training uses an adversarial training strategy in which the artificial neural network is trained, as a generator network, to output an undistorted image from a distorted electron microscopy image input in conjunction with concomitantly training a further artificial neural network, as a discriminator network, to differentiate output produced by the generator network from synthetic electron microscopy images in the training set,
   wherein said training comprises optimizing parameters of the artificial neural network by optimizing a generator loss function and optimizing parameters of the further artificial neural network by optimizing a discriminator loss function, in which a dependency exists between said generator loss function and said discriminator loss function so as to train said generator network and said discriminator network in an adversarial manner,
   wherein said generator loss function comprises:
      at least one loss function component to penalize a norm value of pixel-based differences between a restored image, generated as output of the generator network in response to distorted images from said training image pairs, and the corresponding training undistorted image,
      at least one loss function component to penalize a norm value of pixel-based differences between said restored image and the corresponding training undistorted image after application of a whitening transform having a predetermined window size to both said restored and training undistorted image,
      an adversarial loss function component to reward a commensurate loss of the discriminator loss function,
   and at least one of the following:
      at least one loss function component to penalize a norm value of pixel-based differences between a Fourier transform of said restored image and a Fourier transform of said undistorted image, and
      at least one loss function component to penalize a deviation between the statistical mean, the standard deviation and/or another statistical measure of said restored image and said undistorted image.

7. The method of claim 6, wherein said generator loss function comprises at least a loss function component representative of an $L_1$-norm of pixel-based differences between said restored image and said corresponding training undistorted image and a loss function component representative of an $L_2$-norm of pixel-based differences between said restored image and said corresponding training undistorted image.

8. The method of claim 6, wherein said artificial neural network has a convolutional neural network, a dense network, a residual dense network, a grouped residual dense network, and/or a concatenated grouped residual dense network architecture,
   in which said concatenated grouped residual dense network architecture corresponds to a grouped residual dense network architecture, either with or without an attention module in a final up-convolutional output block of the network, in which the cascading chain of grouped residual dense blocks further comprises a feature concatenation of the outputs of the grouped residual dense blocks, a feature fusion and a semi-global residual connection for globalizing hierarchical features.

9. The method of claim 6, wherein said further artificial neural network uses a relativistic discriminator, and/or comprises a convolutional patch discriminator, and/or comprises a modified convolutional patch discriminator without zero-padding layers and in which the batch normalization layers in said modified convolutional patch discriminator are replaced by instance normalization layers.

10. The method of claim 6, wherein said generating of a plurality of training image pairs comprises creating undistorted synthetic images that include:
scanning electron microscopy modality images and imaging detector electron microscopy modality images,
images of different specimen atomic sizes, atomic distances, atomic vibrations, lattice parameters and relative intensities between atomic species, and
images corresponding to different microscope settings and/or properties, including at least different acceleration voltages, magnifications and detection system transfer functions.

11. The method of claim 6, wherein said generating of a plurality of training image pairs comprises creating distorted images that include combinations of simulated noise and/or artefacts representative of different noise and/or artefact sources of varying severity and relative weights.

12. The method of claim 6, wherein said creating of the undistorted synthetic electron microscopy image comprises generating a specimen representation and then generating the undistorted synthetic electron microscopy image of the specimen representation by simulating an electron-specimen interaction and/or image formation process.

13. The method of claim 12, wherein said generating the specimen representation comprises, for a selected crystalline specimen type:
randomly selecting a random number of unique atomic types and randomly sampling the corresponding atomic numbers, Z, for each unique atomic type,
randomly selecting a crystallographic space group, and
randomly sampling lattice parameters and asymmetric unit cell positions within the constraints corresponding to the selected space group symmetry,
and/or wherein said generating the specimen representation comprises, for a selected amorphous specimen type:
randomly selecting a unique atomic type by sampling the corresponding atomic number, Z, and
randomly sampling atomic positions for atoms of the selected type, until a randomly selected target density is reached.

14. The method of claim 12, wherein said generating the specimen representation comprises:
randomly applying a space region modification with an occurrence probability less than 1, in which the space region modification comprises the removal of all content from a random volume in the specimen representation,
randomly applying a defect modification with an occurrence probability less than 1, in which the defect modification comprises randomly changing the atomic position, radius and/or height of randomly selected atoms in the specimen representation, and/or
adding a support layer with random characteristics to the specimen representation.

15. The method of claim 6, wherein said generating the undistorted synthetic electron microscopy image comprises simulating an image as dependent on atomic number, Z, and/or applying a contrast reversal.

16. The method of claim 15, wherein simulating said image as dependent on atomic number comprises synthesizing the undistorted synthetic electron microscopy image by a linear superposition of a projected signal for each atom in the specimen representation, wherein each projected signal is modelled as a two-dimensional radial symmetric function in the projection plane corresponding to the image space, wherein said radial symmetric function comprises a weighted sum of a Gaussian, an exponential and a Butterworth function with parameters of the radial symmetric function being determined by the atomic number and the microscope parameters.

17. The method of claim 6, wherein the step of creating said distorted image from the synthetic image for use as training input to the artificial neural network by simulating additional noise and artefact features in the image comprises selecting from at least a direct image formation modality and a scanning modality,
in which creating the distorted image comprises, when the direct image formation modality is selected, simulating at least a camera modulation transfer function and a readout noise model, and also a photon shot noise model, a fixed-pattern noise model, and/or a dark-current noise model,
in which creating the distorted image comprises, when the scanning image formation modality is selected, simulating a scanning jitter model, and also a detector noise model, a fast scan noise model, and/or a row-line noise model or optionally also comprises simulating a black pixel noise model, a Zinger noise model and/or a quantization noise model.

18. An artificial neural network for reducing noise and/or artefacts in an electron microscopy image, in which said artificial neural network is trained by a method in accordance with claim 6.

* * * * *